Dec. 15, 1964    D. N. JUDELSON    3,161,097
CUTTING MACHINE
Original Filed March 18, 1958    7 Sheets-Sheet 1

INVENTOR
DAVID N. JUDELSON
BY
Amster + Levy
ATTORNEY

Dec. 15, 1964  D. N. JUDELSON  3,161,097
CUTTING MACHINE
Original Filed March 18, 1958  7 Sheets-Sheet 2

INVENTOR
DAVID N. JUDELSON
BY Amster & Levy
ATTORNEY

Dec. 15, 1964   D. N. JUDELSON   3,161,097
CUTTING MACHINE
Original Filed March 18, 1958   7 Sheets-Sheet 4

INVENTOR
DAVID N. JUDELSON
BY
Amster + Levy
ATTORNEYS

Dec. 15, 1964   D. N. JUDELSON   3,161,097
CUTTING MACHINE
Original Filed March 18, 1958   7 Sheets-Sheet 5

INVENTOR
DAVID N. JUDELSON
BY Ameter & Levy
ATTORNEY

Dec. 15, 1964   D. N. JUDELSON   3,161,097
CUTTING MACHINE
Original Filed March 18, 1958   7 Sheets-Sheet 6

INVENTOR
DAVID N. JUDELSON
BY Amster + Levy
ATTORNEY 3,161,097
CUTTING MACHINE
David N. Judelson, New York, N.Y., assignor to Oscar I. Judelshon, Inc., New York, N.Y., a corporation of New York
Original application Mar. 18, 1958, Ser. No. 722,301. Divided and this application Jan. 8, 1960, Ser. No. 1,368
16 Claims. (Cl. 82—48)

The present invention relates generally to machines for cutting material such as cloth, paper and the like, and in particular to an improved manually and automatically operable rotary knife type of cutting machine for cutting a roll of material wound on a core into plural strips, each of a prescribed width.

This is a division of my copending application Serial Number 722,301, filed March 18, 1958 and entitled Cutting Machine.

Rotary knife cutting machines of the type which enables the manual cutting of a roll of material into a number of strips of a prescribed width are generally known in the trade and find widespread application, particularly for cutting straight and bias cut fabrics into relatively narrow strips or tapes. These machines fall into two general categories, those in which the roll of material is moved longitudinally relative to the knife between successive cutting cycles to step off the width of successive cuts, and those in which the knife is moved longitudinally relative to the roll of material for the same purpose. In U.S. Patent No. 2,457,310 of December 28, 1948, there is illustrated a machine of the latter type including a frame upon which is supported a stationary shaft for receiving a roll of material wound on a core and usually enclosed within a paper wrap. The roll of material is rotated about the stationary longitudinal axis provided by the supporting shaft by means of a chuck which engages one end of the roll and is driven from an appropriate variable speed drive. A high speed rotary knife is mounted on a knife carrier movable toward and away from the stationary supporting shaft. The carrier in turn is mounted on a movable carriage which has an indexing mechanism selectively engageable with the frame of the machine such that the carriage may be moved stepwise through a prescribed and adjustable traversing stroke for moving the rotary knife into successive indexed cutting positions along the length of the machine toward the chucked end of the roll of material. After each stepwise advance of the carriage, the operator actuates the knife carrier to move the rotary knife inwardly toward the stationary supporting shaft such that the rotary knife moves in a cutting plane substantially at right angles to the longitudinal axis of the roll and shears transversely through the roll of material and its core.

In using this type of rotary knife cutting machine, the operator takes the roll of material and usually trims up one end face of the roll. Thereupon the roll of material is slipped over the supporting shaft with the trimmed end face abutting against the chuck which is operative to rotate the roll of material about the stationary shaft during the cutting operation. The chuck is usually connected to the roll of material by a series of clamping jaws or pins which are mounted on the chuck at locations radially outwardly of the outer periphery of the roll. The clamping jaws or pins are penetrated into the outer periphery of the roll of material to rotate the roll and its core about the supporting shaft at a rate dependent upon the variable speed drive to the chuck. After the roll of material is supported on the machine, the operator makes the appropriate adjustment for the indexing mechanism in accordance with the width of the cut to be made such that the indexing mechanisms will allow successive longitudinal traversing strokes of the knife carriage to bring the rotary cutting knife into successive cutting positions. The operator manually moves the knife carrier such that the high speed rotary knife cuts into and through the turning roll and core at the end remote from the trimmed end face connected to the chuck. When the rotary cutting knife is retracted to a clearance position relative to the roll, the carriage is manually actuated to traverse the knife carriage through the longitudinal stroke established by the indexing mechanism to bring the rotary cutting knife into the next cutting position. This operation is repeated until the roll is cut into the strips or cuts of the required width. In actual practice, as the carriage with the cutting knife approaches the chucked end of the roll of material, there is a pronounced tendency for the beveled edge of the cutting knife to pull the roll of material axially and in a direction away from the chuck. This pulling force becomes more pronounced as the chucked end of the roll is approached and manifests itself in causing the end face of the roll being cut to assume a somewhat conical taper with the apex of the conical taper contiguous to the core and longitudinally displaced along the core axis away from the chuck. Correspondingly, the trimmed and chucked end of the roll is formed with a progressively increasing conical depression, with the apex of the cone substantially at the core and spaced away from the chuck. This undesired action may be attributed to the fact that the core and the plies of material wound thereon have less resistance to the axial pulling force exerted by the cutting knife in the direction away from the chuck as the chuck is approached. Under normal cutting conditions, the operator attempts to manually counteract this tendency by pressing in against the end face of the roll remote from the chuck during cutting to attempt to resist movement of the roll away from the chuck under the influence of the cutting knife. Often when the operator approaches a cutting position several cuts removed from the chucked end of the roll, it is necessary to release the roll from the chuck, turn the roll end to end, trim off the previously trimmed end face which is formed with an inwardly directed conical depression as a result of the longitudinal displacement of the core and plies of material incident to the cutting action and reclamp the retrimmed roll of material before taking the last few cuts while pressing against the cut end face remote from the chuck to minimize the tendency of the material to displace under the influence of the cutting knife.

It will be appreciated that this known manual type of cutting machine requires a relatively skilled operator in constant attendance at the machine for making the successive cuts in the roll of material. Further, the very nature of the mechanisms involved and the characteristics of the material being cut often require the operator to exercise a relatively high order of skill to obtain uniform cuts from the roll. Still further, the operator must be careful when indexing the machine to be certain that the successive indexed cutting positions are maintained and not disturbed. If the operator is not cautious during the indexing operation, the operator may over-index by exerting excessive force on the indexing mechanism or may not index through the full distance. Still further, the operator may accidentally allow the carriage to back off from the indexed cutting position prior to making the cut, or may not hold the indexed cutting position while bringing the knife toward the roll of material. Still further, the operator must attempt to manually compensate for the longitudinal displacement of the material incident to approach to the chucked end of the roll and is often required to exercise a certain amount of judgment in obtaining the maximum effective utilizaiton of the material. Necessarily, a relatively skilled operator must be employed for this type of cutting equipment which is a contributing factor to the overall cost of the cutting operation. Even with a skilled operator, known machines are often wasteful of material and do not produce cuts of uniform width and of sharp definition along their cut faces.

It is broadly an object of the present invention to provide an improved cutting machine which obviates one or more of the aforesaid difficulties. Specifically, it is within the contemplation of the present invention to provide an improved cutting machine suitable for cutting a roll of material wound on a core into a number of cuts of a prescribed width on a substantially automatic basis.

Among the further objects of the present invention are the provision of a cutting machine which is suitable for both automatic and manual operation; the attainment of precision cutting with respect to the width of the cut, the properties of the cut faces and the orientation of the opposite cut faces of each cut with respect to each other; the realization of a high speed cutting cycle under control conditions selected to assure proper penetration and cutting of the roll of material; the effective utilization of material with minimum waste; and the ability to cut on an automatic basis with a minimum requirement for attendance by an operator at the equipment.

In accordance with a first aspect of the invention, my improved manually and automatically operable cutting machine includes a roll supporting and turning arrangement adapted to receive and turn a roll of material on its axis, a knife assembly mounted for movement toward and away from the roll supporting and turning arrangement, means operatively connected to the knife assembly or carrier for moving the same through a cutting cycle at a first rate of travel and means responsive to movement of the knife assembly through a portion of its cutting cycle for moving the knife assembly at a different rate of travel. Advantageously, the cutting cycle may be established with a relatively high speed approach of the knife assembly at the start of the cutting cycle to the roll such that the knife quickly reaches the outer periphery of the roll, with a reduction in speed when the cutting edge of the knife is contiguous to the outer periphery of the roll to enable the penetration of the knife into the roll under conditions assuring precise cutting and precluding stripping or ravelling of the paper wrap and/or the outer plies of the material wound on the roll. Further, a prescribed cutting speed may be established for the knife assembly which is substantially independent of the approach speed and which may be selected in accordance with the type of material being cut and the diameter of the roll. Still further, after the actual cutting portion of the cutting cycle, during which the knife assembly travels at the prescribed cutting speed, which may be progressively increased as the knife approaches the core of the roll, the invention contemplates the withdrawal of the knife assembly to a clearance position relative to the roll at a relatively high speed, which may be the same as the approach speed as a matter of convenience.

In accordance with still further aspects of the invention, the knife assembly or carrier is mounted for movement through a cutting cycle which includes an adjustable forward stroke and a substantially fixed return stroke. The facility for adjusting the forward stroke allows the operator to increase the length of the forward stroke as the peripheral cutting edge of the rotary cutting knife wears down with use such that the cutting edge may be advanced to the limit position required to penetrate entirely through the roll and its supporting core. The return to a fixed retracted position, which is advantageously established by means including a fixed stop and a spring which biases the knife carrier against the stop, enables the return of the rotary cutting knife into contact with a grinding means after each cutting cycle, with the means which established the fixed retracted position providing the necessary reaction force to the grinding means, thereby assuring accurate grinding of the cutting edge of the knife.

As a still further feature of the invention, the traverse drive which is operatively connected to the knife carriage for moving the knife carriage through successive longitudinal indexing increments along the frame of the machine toward the chucked end of the roll, is periodically deactivated by an indexing mechanism on the knife carrier which is selectively enagageable with the frame and is adjustable to establish the length of the successive traversing increments which corresponds to the width of the cuts to be made in the roll. Means for cycling the knife assembly are provided which are responsive to the operation of the indexing mechanism and are arranged in controlling relation to the knife carrier for initiating the cutting cycle after the knife carriage moves through the required traverse increment. As a further aspect of the invention, provision is made for establishing a grinding interval after the carriage travels through the traverse increment and preliminary to the initiation of the cutting cycle such that the requisite grinding of the knife may be achieved preliminary to each cutting cycle.

As a still further feature of the invention, the indexing mechanism which periodically stops the knife carriage during successive longitudinal traversing increments includes first and second stops which contact after the prescribed traversing increment. The contact of the stops establishes the indexed cutting position for the knife carriage and the traversing drive is provided with a slip clutch which slips to enable the carriage to remain in the indexed cutting position and maintains the first and second stops in contact with each other. Advantageously, as the stops approach each other for establishing the indexed cutting position of the knife carriage, provision may be made for adjusting the slip clutch such that the effective coupling to the knife carriage is decreased from the effective coupling during the major portion of the traverse of the knife carriage whereby the requisite holding effect between the first and second stop is achieved by the clutch without causing excessive contact pressure between the stops.

As a still further feature of the invention, provision is made for establishing at least one prescribed rate of travel for the knife carrier during the cutting cycle, which prescribed rate of travel is maintained over the major portion of the machine cycle as the knife carriage approaches the chucked end of the roll. However, means are provided which are responsive to the approach of the carriage to the chucked end of the roll for establishing a slower rate of travel for the carrier during the remaining cutting portions of the machine cycle such that any tendency which the rotary knife may have to disengage the remaining portion of the roll of material from the chuck is minimized. This assures the provision of excellent cuts despite the decrease resistive force of the plies of material of the remaining portion of the roll of material, which resistive force counteracts the tendency of the roll of material to move away from the chuck under the influence of the beveled edge of the knife. Further, this minimizes the tendency of the roll to disengage from the chuck, as by being compressed radially inwardly by the knife in an amount sufficient to release the outer periphery of the roll from the chuck pins.

In accordance with a still further feature of the invention, improved mechanisms are provided whereby with a single adjustment, the forward or operative stroke of the cutter assembly or carrier may be adjusted for both automatic and manual operation to compensate for the progressively decreasing diameter of the rotary cutting knife incident to grinding. In a typical embodiment, a drive for automatic operation is coupled to the knife assembly to move the knife assembly through a prescribed forward stroke to bring the peripheral cutting edge of the rotary cutting knife to a required inner limit position contiguous to the stationary roll-supporting shaft. The coupling means for connecting the drive to the knife assembly includes a lost motion mechanism having a driver and a follower, the latter serving as an actuating member for moving the knife assembly through the prescribed forward stroke. The follower is adjustable toward the driver as the peripheral cutting edge of the knife wears to increase the forward or operative stroke such that the cutting edge of the knife will be moved to an adjusted inner limit position contiguous to the roll-supporting shaft. Manual actuating means are provided for operating the knife assembly, with the follower being operatively connected to the manual actuating means and being movable away from its driver upon manual movement of the knife assembly through the prescribed stroke into the inner limit position. A stop is arranged to coact with the follower of the lost motion mechanism and is contacted by the follower upon movement of the knife assembly through the prescribed forward stroke. Means are provided for adjusting the follower relative to the driver such that the follower may be moved toward the driver and simultaneously moved away from the stop whereby, by this one adjustment, the successive inner limit positions are established as the knife wears for both automatic and manual operation.

The above brief descirrption, as well as further objects, features, advantages and aspects of the invention, will be more fully appreciated by reference to the following detailed description of a presently preferred, but illustrative, embodiment of an improved cutting machine in accordance with the present invention, when taken in conjunction with the accompanying drawings, wherein.

Figure 1:
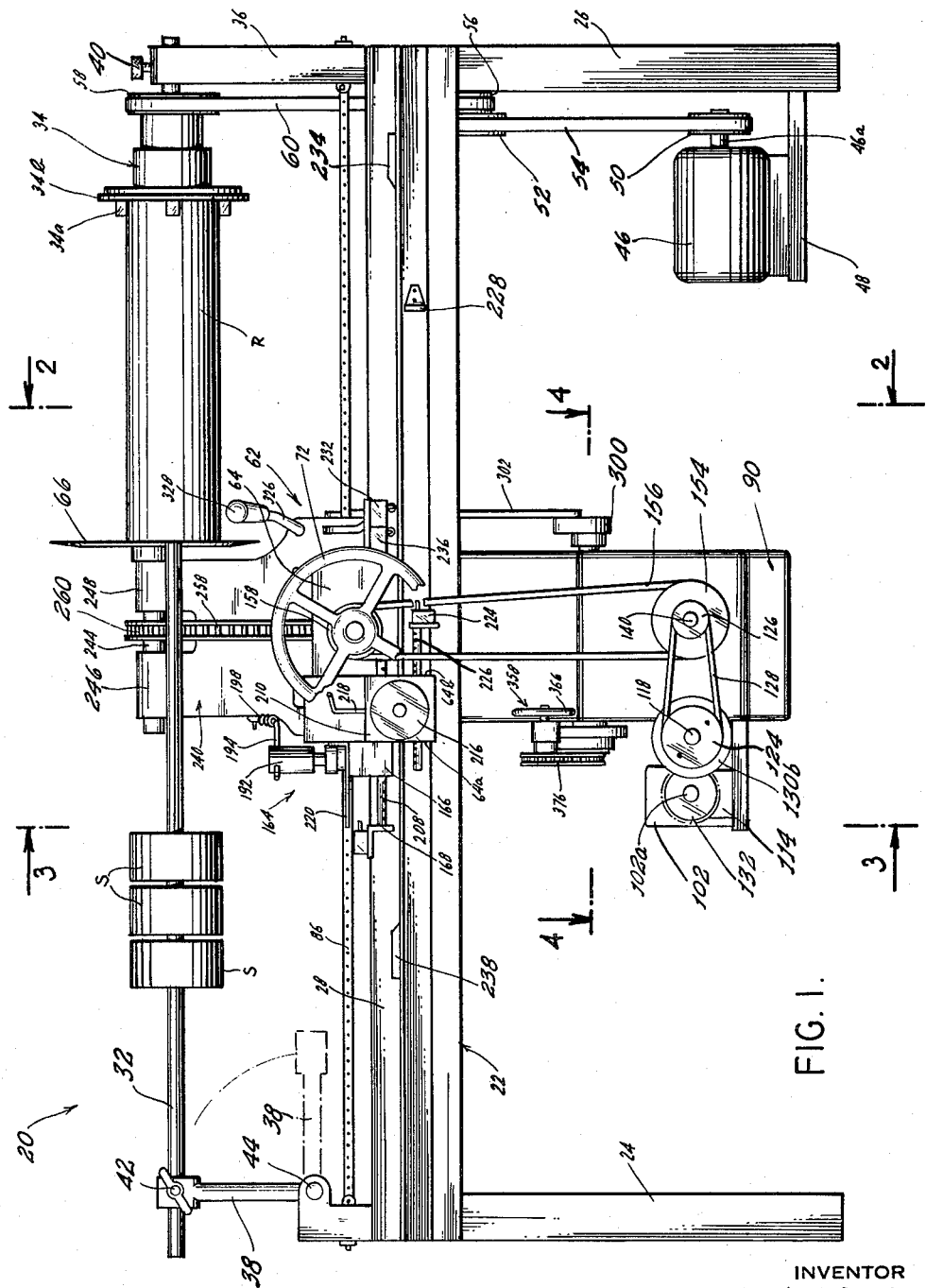
FIGURE 1 is a front elevational view of an improved automatically operable rotary knife cutting machine demonstrating features of the present invention.

Referring now specifically to the drawings, there is shown my improved rotary knife cutting machine, generally designated by reference numeral 20, which includes a machine frame 22 having opposite end walls or castings 24, 26. Connected between the end walls 24, 26 are front and rear track members or rails 28, 30.

Extending longitudinally of the machine frame 22 is a roll supporting and turning arrangement which includes a stationary supporting shaft 32 and a rotatable chuck 34. The stationary supporting shaft 32 receives the roll of material, generally designated by the letter R, which is wound on a core C and is adapted to be cut into plural strips or cuts S, either on a manual or substantially automatic basis. The stationary supporting shaft 32 is supported at its end carrying the chuck 10 by a standard 36 fixed to the end wall 26 and at its opposite end by an upstanding bracket 38 pivoted on the end wall 24. The stationary supporting shaft 32 is cradled in respective yokes at the upper ends of the brackets or standards 36, 38 and is secured in its stationary roll-supporting position by lock members 40, 42. The upstanding bracket 38 is mounted on a horizontal, transversely-extending axle or pin 44 such that the bracket may be rocked to the broken line inclined position illustrated in FIGURE 1 wherein the roll of material R may be slipped over the stationary supporting shaft, followed by the return of the upstanding bracket 38 to the full line supporting position wherein the adjacent end of the shaft 32 is cradled and supported.

The chuck 34 which serves to turn the roll R about the longitudinal roll axis defined by the roll-supporting shaft 32 is of the type which includes a number of roll-penetrating pins 34a which may be engaged into the outer periphery of the roll for fixing the roll R with one end face thereof against the adjacent end face of the chuck plate 34b. For a detailed description of the improved chuck 34 which is to be employed in the present machine, reference should be made to my copending application Serial No. 694,169 filed November 4, 1957 and entitled "Improved Chuck" which is now U.S. Patent No. 2,938,733 of May 30, 1960. It is intended that the complete disclosure of said copending application be incorporated herein by reference, although not set forth fully in the interests of simplicity and clarity.

As seen best in FIGURE 1, the chuck 34 is rotated about the stationary roll-supporting shaft 32 at a prescribed roll-turning speed by a chuck drive motor 46 mounted on a platform 48 carried by the end wall 26 of the machine frame 22. The drive shaft 46a of the chuck drive motor 46 is coupled to the chuck 34 by a belt and pulley coupling, including the pulley 50 on the shaft 46a, the intermediate pulley 52 journaled on the machine frame, the belt 54 trained over the pulleys 50, 52, the further intermediate pulley 56 connected to and driven by the pulley 52, the further pulley 58 connected to the chuck 34 and the belt 60 trained over the pulleys 56, 58. The belt and pulley coupling is arranged to achieve the required speed reduction between the motor shaft 46a and the chuck 34.

Mounted on the machine frame 22 is a knife assembly, generally designated by the reference numeral 62, which includes a knife carriage 64 which is movable longitudinally of the machine frame 22 by successive longitudinal traversing increments or strokes to bring the high speed rotary cutting knife 66 into successive indexed cutting positions, as will now be described in detail.

The knife carriage or casting 64 (see FIGURES 2 and 3) incorporates a front guide block or member 68 in sliding engagement with the front rail 28 of the frame 22 and a rear guide block or member 70 in sliding engagement with the rear rail 30 of the frame 22. The knife assembly 62 is manually moved longitudinally of the machine frame 22 by a traversing hand wheel 72 and a chain and sprocket drive, seen best in FIGURES 1 and 3. The traversing hand wheel 72 is fixed to a hand wheel shaft 74 which extends fore and aft of the machine frame 22 and is journaled in the front guiding block 68 of the carriage casting 64. Extending in spaced parallel relation to the hand wheel shaft 74 is a sprocket shaft 76 which is journaled between the front and rear guiding blocks 68, 70. The hand wheel shaft 74 is coupled to the sprocket shaft 76 by meshing gears 78, 80, with the gear 78 fixed to the hand wheel shaft 74 and the gear 80 fixed to the sprocket shaft 76. The purpose of the gearings 78, 80 is to make the direction of movement of the knife carriage coincide with the direction of turning of the hand wheel 72, as will appear hereinafter. Fixed to the sprocket shaft 76 are the front and rear traversing sprockets 82, 84 which are in engagement respectively with front and rear traverse chains 86, 88. The front and rear traverse chains 86, 88 are stretched between and anchored to the opposite end walls 24, 26 of the machine frame 22. Accordingly, upon turning the hand wheel 72 in the clockwise direction, that is, to the right when viewed in FIGURE 1, the knife assembly 62 will traverse to the right toward the chucked end of the roll; and conversely, upon turning the hand wheel 72 in the counterclockwise direction, that is, to the left when viewed in FIGURE 1, the knife assembly 62 will traverse to the left away from the chucked end of the roll.

In addition to the provision for manual traversing of the knife assembly 62 to the right and left of the machine frame, an automatic driving arrangement is also provided which is supported by and is movable with the knife carriage 64. Specifically, and as seen best in FIGURES 1 to 4 inclusive, the knife carriage 64 carries a depending or underslung casting or housing 90. As will be detailed hereinafter, the mechanisms mounted on and in the housing 90 serve both to effect automatic carriage traverse and to move the high speed rotary knife 66 through its cutting cycle.

At the lower rear side, the movable housing 90 carries a first supporting plate 92 upon which is mounted an electric motor 94 incorporating an eddy current clutch serving as a variable speed drive source. The variable speed electric motor and its clutch 94 are a commercially available unit and may be of the type sold by the Dynamatic Division of the Eaton Manufacturing Co., Kenosha, Wis., as described in their brochure entitled "Eaton Dynamatic" of May, 1955 (Revision A). Further characteristics of the motor will be detailed in connection with the description of the improved control system illustrated in FIGURE 15. Coupled to one end of the drive shaft 94a of the motor 94 is an electric brake 96 which may be selectively energized to achieve instantaneous braking of the motor 94 as required during the operating cycle of the machine. The other end of the motor shaft 94a is connected via a coupling sleeve 98 and a coupling shaft 100 to a speed reduction gearing unit 102 which has its output shaft 102a extending at right angles to the motor 94 and coupled shafts 94a, 100. The output shaft 102a is coupled directly to the left or return traverse drive arrangement, generally designated by the reference numeral 104. The meshing bevel gears 106, 108 are arranged to introduce an additional speed reduction of approximately 3:1 such that the left or return traverse drive is approximately three times faster than the right or forward traverse drive.

The return traverse driving arrangement 104 includes a return actuating shaft 112 coupled directly to the output shaft 102a of the speed reduction gearing unit 102. The return actuating shaft 112 is journaled on a bearing 114 which is carried by a further supporting plate 116 fixed to the housing 90 and projecting from one side thereof. Extending parallel to the return actuating shaft 112 is a return idler shaft 118 which is journaled on spaced bearings 120, 122 carried by the supporting plate 116. The return idler shaft is connected to the shaft 74 of the manual traverse drive by belt and pulley couplings, which include the return driving pulley 124 coupled to the intermediate pulley 126 by a belt 128 trained thereover. The coordination of the return traverse driving arrangement 104 into the overall automatic traverse drive will be more fully appreciated as the description proceeds.

Mounted on the return idler shaft 118 is a return or left traverse electric clutch 130 of the slip clutch type for selectively engaging and disengaging the return traverse drive 104. The electric clutch includes a driving clutch member 130a loosely journaled on the idler shaft 118, a driven clutch member 130b fixed to the idler shaft 118 and to the traverse driving pulley 124, commutator rings 130c for energization of the clutch 130 to control the slip thereof in dependence upon the excitation current applied thereto, and appropriate brushes 130d in contact with the commutator rings 130c and energized as will be detailed in conjunction with the description of the control system. The driving clutch member 130a is connected to the return actuating shaft 112 by meshing gears 132, 134 connected respectively to the return actuating shaft 112 and to the driving clutch member 130a. The driving member 130a will be continuously driven in the direction indicated by the full line arrows upon energization of the main driving motor 94, while the driven clutch member 130b will be selectively coupled to the driving clutch member 130a for movement in the direction indicated by the broken line arrow in accordance with the excitation of the electric clutch 130.

The forward traversing drive arrangement 110 includes a forward actuating shaft 136 which is connected to the bevel gear 108 and is driven at the reduced speed established by the bevel gears 106, 108. The forward actuating shaft 136 is journalled on the housing 90 by a bearing 138 and is coupled to a forward idler shaft 140 by meshing bevel gears 142, 144. The knife cycling drive is taken from the forward actuating shaft 136 by the meshing spur gears 146, 148 as will be described hereinafter. The forward idler shaft 140 extends parallel to the return idler shaft 118 and is journaled on the housing 90 at its rear end by a bearing 150 which is supported on the bottom wall of the housing 90 and at its forward end by a hub 152 which projects from the front wall of the housing 90. The forward idler shaft carries a forward drive pulley 154 which is coupled via the belt 156 to the forward and return driven pulley 158 fixed on the shaft 74 of the manual traverse drive.

Mounted on the forward idler shaft 140 is a forward or right traverse electric slip clutch 160 and a traverse brake 162. The forward traverse clutch 160 is similar to the return traverse clutch 130 and includes a driving clutch member 160a journaled on the idler shaft 140 and coupled via the gearing 142, 144 to the forward actuating shaft 136, a driven clutch member 160b connected to the forward idler shaft 140, commutating rings 160c, and commutator brushes 160d which receive excitation current in the control system as will be detailed hereinafter. The brake 162 which serves to brake the automatic traverse drive during both the forward and return movement includes a stationary brake shoe 162a which is selectively coupled to the driven clutch member 160b in accordance with the energization current applied at the input terminals 162b.

Upon energization of the left traverse clutch 130, drive will be provided from the variable speed motor 94 to the traversing sprockets 82, 84 on the sprocket shaft 76 as follows:

The speed reduction gearing unit 102, the left traverse actuating shaft 112, the gearing 132, 134, the energized clutch including the driven member 130b coupled to the idler shaft 118, the left traverse driving pulley 124, the belt 128, the intermediate pulley 126 on the idler shaft 140, the drive pulley 154, the belt 156, the pulley 158, the hand wheel shaft 74, and the gearing 78, 80.

Upon energization of the right traverse clutch 160, drive will be provided from the motor 94 to the traversing sprockets 82, 84 as follows:

The speed reduction gearing unit 102, the bevel gearing 106, 108, the right traverse actuating shaft 136, the bevel gearing 140, 144, the right traverse clutch 160 including the driven member 160b coupled to the idler shaft 140, the driving pulley 154, the belt 156, the pulley 158, the hand wheel shaft 74, and the gearing 78, 80.

Referring now specifically to FIGURES 1 and 5 to 8 inclusive, there is shown an indexing or cut-sizing mechanism, generally designated by the reference numeral 164, which serves to limit the movement of the knife carriage 64 after traverse through a prescribed longitudinal traverse increment or stroke. A similar indexing mechanism is found in my U.S. Patent No. 2,457,310 and is generally characterized by an indexing block 166 which is releasably engageable with the machine frame 22 to serve as a relatively fixed stop, an adjustable block or stop 168 which is adjustable relative to the carriage and is movable therewith into contact with the indexing block 166 after a prescribed longitudinal traversing stroke of the knife carriage 64 to establish an indexed cutting position for the knife carriage. The indexing block 166 is formed in its underside with a guideway 170 which is of a width somewhat in excess of the width of the front rail 28 such that the indexing block or relatively fixed stop 166 can be canted about a vertical center axis to bring the end edges at the opposite sides and ends of the guideway 170 against the rail 28 for locking the indexing block or relatively fixed stop 166 in successive indexed cutting positions.

Mounted on the indexing block 166 are selectively engageable locking means, generally designated by the numeral 172 (see FIG. 8), which normally cants the indexing block 166 to lock the same to the front rail 28 and is released automatically during the forward stroke of the knife carrier, as described hereinafter, for resetting the indexing block. The selectively engageable locking means 172 includes a vertically adjustable eccentric shaft 174 formed with an eccentric 176 adjacent to and spaced from its lower end. The eccentric 176 is arranged to be selectively positioned relative to a transversely extending bore 178 which accommodates a locking plunger 180 having a forward contact face in abutment with the adjacent inner face of the front rail 28, which serves to lock the indexing block or relatively fixed stop 166 to the front rail 28 when engaged by the eccentric 176. The eccentric shaft 174 above the eccentric 176 is provided with spaced horizontally-extending, circumferential upper and lower positioning grooves 182, 184, either of which is adapted to receive a spring-biased, shaft-positioning ball 186. In the automatic spacing position illustrated, with the ball 186 in the groove 182, the eccentric 176 is opposite the locking plunger 180. However, upon exerting an upward pull on the eccentric shaft 174, the ball 186 may be engaged in the lower positioning groove 184 to displace the eccentric 176 upwardly and into a clearance position relative to the locking plunger 180 wherein the selectively engageable locking means 170 is disabled which, in turn, renders the indexing mechanism 164 inoperative and allows the free traverse of the knife carriage 64. Fixed to the eccentric shaft 174 are spaced stop collars 188, 190 which limit the vertical adjustment of the eccentric shaft 174 between a lower limit position as illustrated, wherein the locking means 172 is operative, and an upper limit position with the ball 186 in the lower positioning groove 184 wherein the locking means is inoperative.

On the upper end of the eccentric shaft 174 there is secured an actuating head 192 which may be lifted and depressed to disengage and engage the locking means 172 and which may be turned by an actuating lever 194 for periodic release of the locking means 170 incident to the movement of the knife carrier 240 through its forward stroke, as will be described hereinafter. The actuating lever 194 is operated from a coupling rod 196 connected to the knife carrier 240 and is normally biased in a direction to engage the eccentric 176 against the locking plunger 180 by a spring 198 mounted on the coupling rod 196 (see FIG. 3).

The indexing block or relatively fixed stop 166 and the knife carriage 64 are movable relative to each other through provision of springs 200 which are anchored by pins 202 at one pair of ends to the knife carriage 64 and at the other pair of ends by pins 204 to the indexing block 166. The springs 200 normally bias the indexing block 166 against the adjacent face 64a of the carriage 64 which serves as a reference plane for the indexing mechanism 164. The bias of the springs 202 is selected such that the carriage 64 may move relative to the indexing block 166 (when the latter is fixed to the frame by the locking means 172) for the longitudinal traversing increment established by the spacing of the movable or adjustable stop 168 relative to the relatively fixed indexing block 166. When the movable stop 168 and relatively fixed indexing block 166 contact each other, the carriage 64 is in its indexed cutting position. Upon release of the selectively engageable locking means 172, the springs 200 are effective to restore the indexing block 66 to its starting position abutting the reference plane or face 64a.

The movable or adjustable stop 168 is fixed at one end of a spacing stop rack 208 which is mounted in an appropriate through guideway 206 provided in a rack housing 210 which is fixed to the carriage 64 by an appropriate bracket. As seen best in FIGURE 5, a rack pinion 212 is journaled in the rack housing 210 on a pinion shaft 214 which carries a size adjustment control knob 216 disposed externally of and in front of the rack housing 210. The control knob 216 may be calibrated to indicate the spacing in inches and fractions of an inch of the movable stop 168 relative to the relatively fixed indexing block 166 prior to successive traversing increments which in turn will establish the width of successive cuts made on the machine. With the described rack and pinion adjustment for the movable stop 168, turning of the control knob 216 in the counterclockwise direction corresponds to adjustment of the movable stop 168 away from the indexing block 166 and an increase in the width of the cut; and conversely turning the knob in the clockwise direction corresponds to movement of the movable stop 168 toward the indexing block 166 and a decrease in the width of the cut. In order to fix the rack and pinion in any prescribed position of adjustment as established by the setting of the control knob 216, there is provided a threaded locking member 218 which is received within an appropriate tapped hole in the rack housing 210 and is turnable to bring its leading end to bear against the rack 208 for fixing the rack and pinion against movement.

Figure 6:
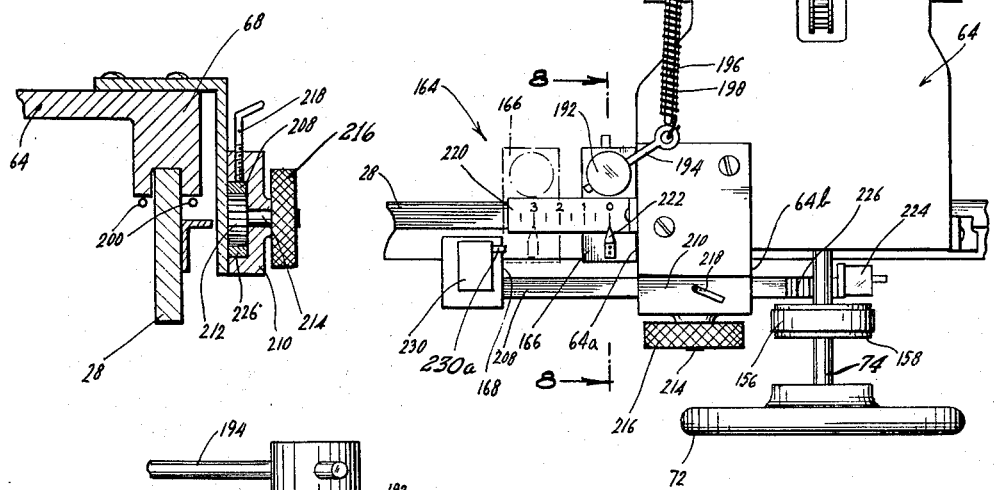
FIGURE 6 is a plan view of the indexing mechanism as shown in FIGURE 5.
Figure 8:
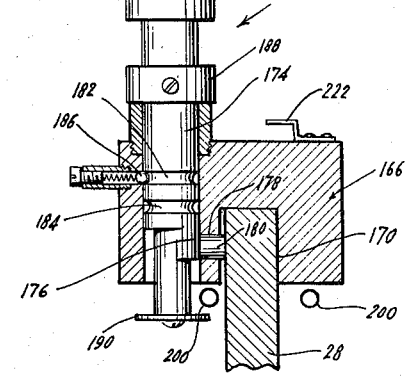
FIGURE 8 is a sectional view on an enlarged scale taken along the line 8—8 of FIGURE 6 and looking in the direction of the arrows.

As a matter of convenience, a further size setting arrangement may be provided which is readily viewable when looking down on the cutting machine. As shown in FIGURE 6, a scale 220 may be fixed to project from the reference plane 64a with its "0" calibration opposite a pointer 222 fixed to the indexing block 166 when the indexing block abuts against the reference plane or surface 64a.

In order to achieve the most effective utilization of material, I have found that it is desirable to aways stop the automatic traverse of the knife assembly 62 at varying distances from the end face of the roll R which abuts the chuck plate 34b, which distances are substantially equal to the width of the cut being taken, despite the possibility that the taversing increment as established by the cut width setting of the indexing mechanism 164 may not have been completed. To this end, limit control means are provided which are operable independently of the indexing mechanism 164 and include a limit switch 224 fixed on one end of a limit switch rack 226 which is in meshing engagement with the pinion 212. Although independently effective to discontinue carriage traverse, adjustment of the movable stop 168 by turning of the control knob 216 will simultaneously achieve a corresponding adjustment of the limit switch 224. The limit switch 224, which is connected in the control system as will subsequently be described, is operated by a limit stop 228 fixed to the frame 22 (see FIGURE 1) and is effective to interrupt the operation of the automatic traverse drive, as will now be described in conjunction with the diagrammatic showings of FIGURES 9 to 11 inclusive.

Figure 9:
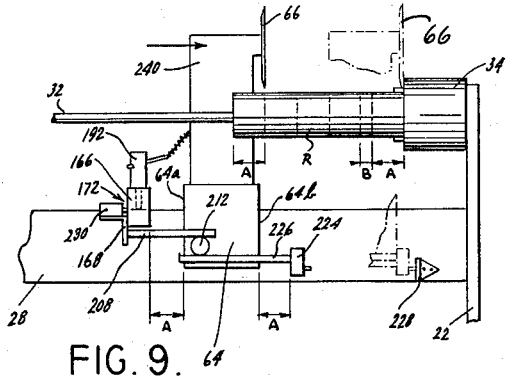
FIGURE 9 is a diagrammatic elevational showing of a portion of the cutting machine and movable knife carriage illustrating the action of the indexing mechanism and showing the indexing mechanism with its parts in the relative position at the start of a cutting cycle.

As seen in FIGURE 9, if the rotary cutting knife 66 were to be brought into a cutting plane coinciding with the end face of the roll R and of the abutting face of the chuck plate 34b (a condition whch never occurs in the operation of the machine) and the indexing mechanism 164 were set at its "0" position, that is, with the indexing block 166 abutting the reference surface 64a and the movable stop 168 abutting the indexing block 166, then the position of the limit stop 228 could be established to contact the limit switch 224 at precisely the time when the cutting knife 66 arrives at the theoretical position, as indicated by the dot-dash lines in FIGURE 9. It will therefore be appreciated that for a size adjustment corresponding to a cut or strip S of the width "A," the limit switch 224 will be positioned to contact the limit stop 228 when the rotary cutting knife 66 reaches a cutting plane or indexed cutting position spaced from the reference plane of the end face of the roll R equal to the dimension "A."

FIGURE 9 diagrammatically shows the relative position of the parts of the indexing mechanism 164 and of the knife assembly 62 just prior to the time when a cut S is to be taken from the roll R of the width "A." The knife carriage 64 has traversed through a longitudinal stroke corresponding to the dimension "A," as is seen by the spacing between the reference surface 64a and the indexing block 166. The indexing blocks or stops 166, 168 are in contact with each other and the knife 66 is retracted. It is noted that the remaining uncut portion of the roll R is of a length which is not a multiple of the cut width "A"; and if successive cuts of the width "A" were taken, there would be left at the chucked end of the roll R a cut of the width "B."

Figure 10:
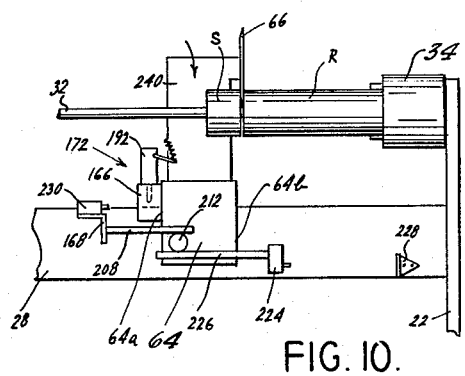
FIGURE 10 is a diagrammatic view similar to FIGURE 9 but showing the relative positions of the parts of the indexing mechanism after the knife has moved through the forward stroke of its cutting cycle and prior to the next traversing increment of the knife carriage.

FIGURE 10 diagrammatically shows the relative position of the parts of the indexing mechanism 164 after the cut S has been taken and preparatory to the next longitudinal traverse of the knife assembly 62. The forward movement of the knife carrier has achieved the release of the locking means 172 such that the indexing block 166 is restored to its normal starting position against the reference surface 64a of the carriage 64.

Figure 11:
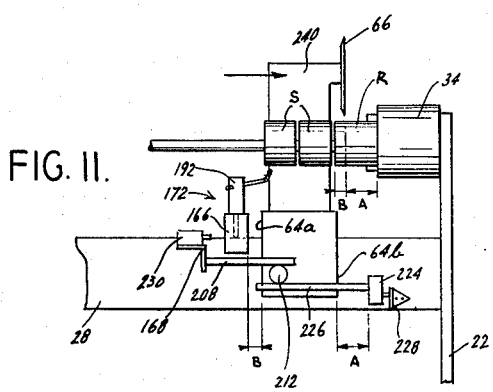
FIGURE 11 is a diagrammatic view similar to FIGURES 9 and 10 illustrating the action of the end limit control incorporated in the machine adjacent the chucked end of the roll.

FIGURE 11 diagrammatically shows the condition of the indexing mechanism 164 when the limit control means inciuding the limit switch 224 and its stop 228 take over to stop the automatic traverse drive, with the rotary cutting knife 66 disposed in an indexed cutting position spaced from the end face of the roll by the dimension "A." In this condition, it is noted that the reference surface 64a of the carriage 64 has traveled away from the relatively fixed indexing block 166 by a distance corresponding to the width "B"; and if it were not for the disabling effect of the limit switch 224 and its stop 228, the carriage 64 would be free to travel through the normal traversing stroke "A" established by the setting of the indexing mechanism 164.

Figure 15:
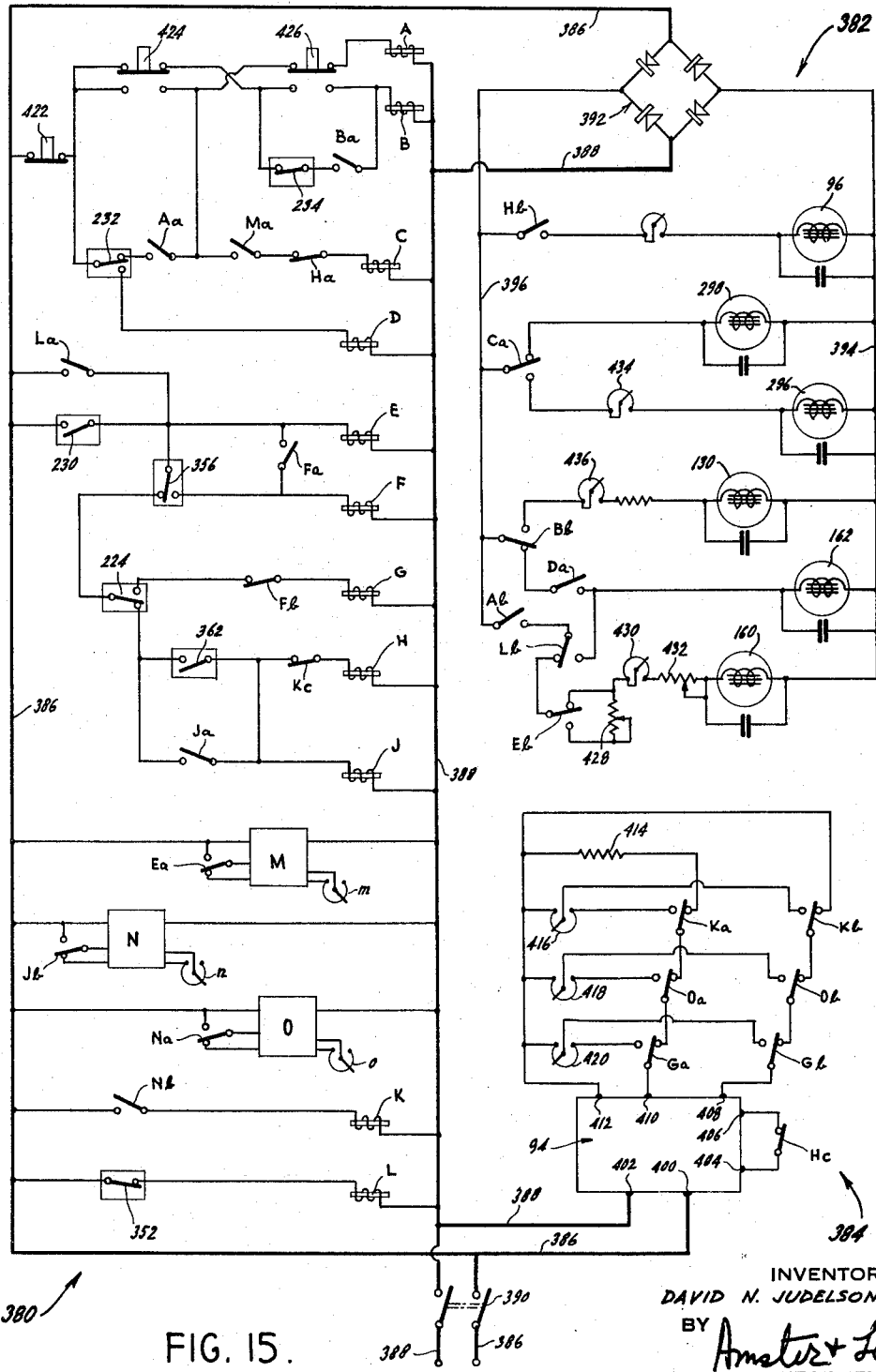
FIGURE 15 is a schematic diagram of the coordinating control system incorporated in the present improved rotary knife cutting machine.

By the above described arrangement which is coordinated into the overall control system as will be detailed in connection with FIGURE 15, the automatic traverse of the knife carriage 64 is stopped when there remains to be cut at least one width, as established by the setting of the indexing mechanism 164, and a part of a width which part depends upon the extent to which the width of the cut is a multiple of the roll length. This enables the operator to determine what would be the most effective utilization of the remaining uncut length of the roll, which is represented in the illustration herein by the length "A"+"B."

As previously detailed, the right or forward traverse drive 110 for the knife carriage 64 includes in its driving chain an electric slip clutch 160 which is selectively energized or excited via the commutator rings 160c and the contacting brushes 160d. Accordingly, when the movable stop 168 of the indexing mechanism 164 contacts the relatively fixed indexing block 166 to establish an indexed cutting position for the knife carriage 64, the automatic traverse drive may be continued with the clutch 160 slipping to continuously urge the movable stop 168 against the relatively fixed stop 166 and with the knife carriage 64 remaining in the indexed cutting position. It will therefore be appreciated that the slipping of the clutch of the forward traverse drive maintains perfect contact between the stops 166, 168 and thereby establishes and maintains, with exceptionally fine precision, successive indexed positions for the knife carriage 64. Advantageously, means may be rendered operable in response to the approach of the movable stop 168 to the relatively fixed stop 166 for decreasing the energization or excitation of the slip clutch 160 whereby the effective coupling to the knife carriage 64 is decreased from the effective coupling during the major portion of the longitudinal traversing increment as established by the setting of the indexing mechanism 164. In the present illustrative embodiment, a slip or glide control switch 230 is mounted on the movable stop 168, with its switch actuator 230a positioned to contact the relatively fixed stop 166 in advance of contact between the stops 166, 168. Upon closing of the switch 230 at a preset distance and time in advance of the end of the traversing stroke, provision is made in the control system shown in FIGURE 15 for decreasing the energization of the slip clutch 160 such that the knife carriage 64 effectively glides or coasts into its indexed cutting position, with the electric clutch slipping when the stops 166, 168 contact each other to maintain the knife carriage 64 in its indexed cutting position until such time as the knife carriage is locked against movement for the time required for the cutting cycle.

In order to establish end limits for the forward and return travels of the knife assembly 62, there is mounted on the knife carriage 64 a forward traverse limit switch 232 which is operated by a forward traverse limit stop 234 (see FIGURE 1) and a return traverse limit switch 236 which is operated by a return traverse limit stop 238. The forward traverse limit stop 234 is arranged to operate the switch 232 when the carriage 64 approaches the chucked end of the roll and at a forward traverse limit position wherein the cutting knife 66 is still spaced from the pins 34a of the chuck 34. This is a precautionary measure to avoid the possibility that the high speed rotary knife might inadvertently be brought into contact with the chuck pins 34a or other portions of the chuck 34. Similarly, a left limit traverse stop 238 is positioned to establish a return limit position for the knife assembly 62 such as to avoid contact of any portion of the knife assembly 62 with the frame 22 at the left end of the machine. The function of the limit switches 232, 236 will be more fully appreciated in connection with the description of the control system illustrated in FIGURE 15.

Figure 2:
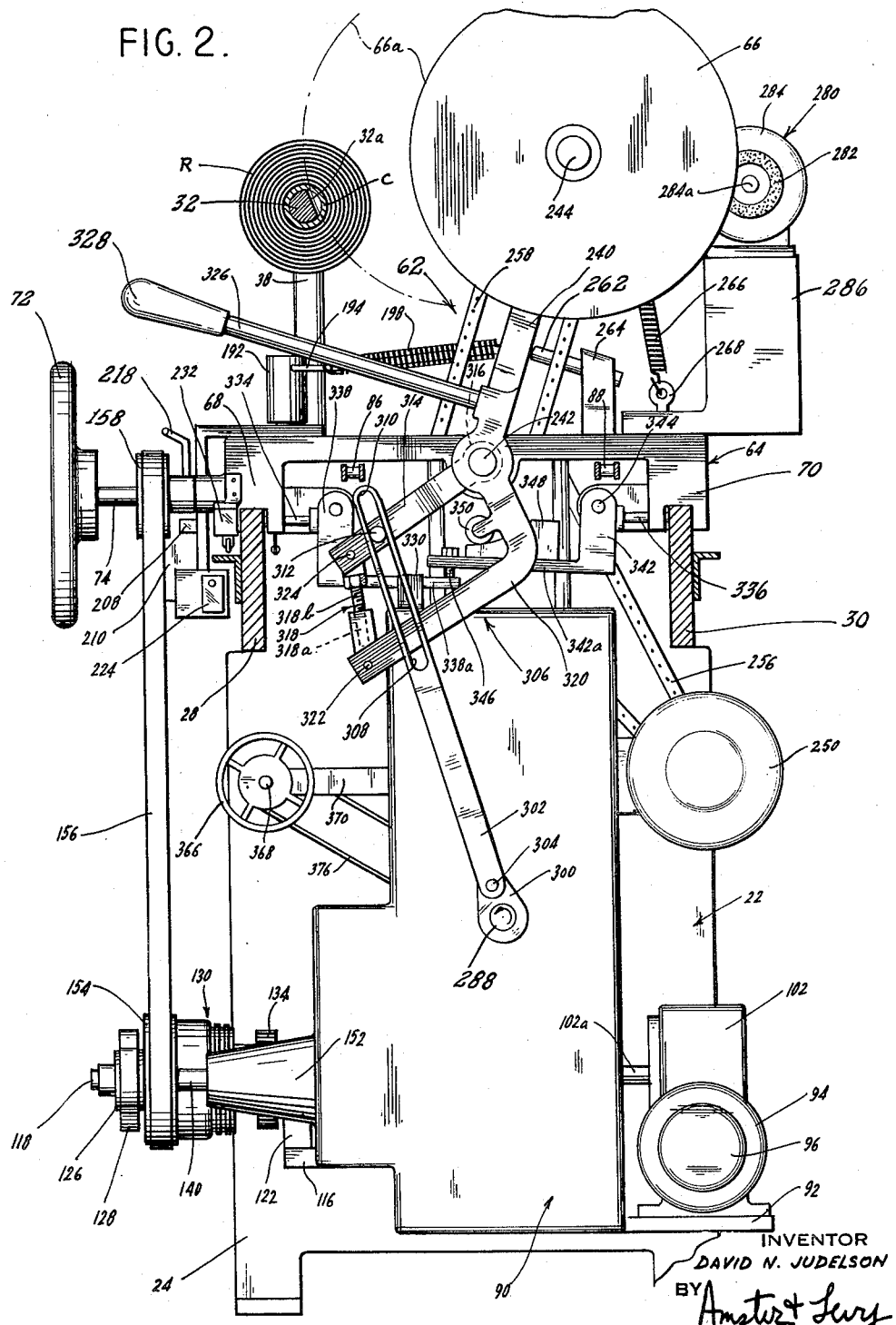
FIGURE 2 is an elevational view, on an enlarged scale and with parts sectioned, taken substantially along the line 2—2 of FIGURE 1 and looking in the direction of the arrows.

The rotary cutting knife 66 is mounted on the knife carriage 64 by a knife carrier 240 for movement through a cutting cycle from a retracted or outer limit position spaced from the roll supporting shaft 32 (see FIGURES 2 and 3) through a forward stroke to an advanced or inner limit position (see the dotted line showing of FIGURE 2). In the advanced or inner limit position, the beveled cutting edge 66a is contiguous to the flat 32a formed on the roll-supporting shaft 32a along the side thereof facing the rotary cutting knife 66. The knife carrier 240 is in the form of an elongated casting which is pivoted adjacent its lower end on the knife carriage on a knife carrier pivot 242. The pivot 242 extends substantially parallel to the roll-supporting shaft 32 and mounts the carrier 240 for swinging movement toward and away from the shaft 32 whereby the knife may be advanced and retracted in a cutting plane at right angles to the axis of the shaft 32. The rotary cutting knife 66 is fixed to a knife shaft 244 which extends parallel to the carrier pivot 242 and is journaled in bearings 246, 248 on the upper end of the carrier casting 240.

Figure 3:
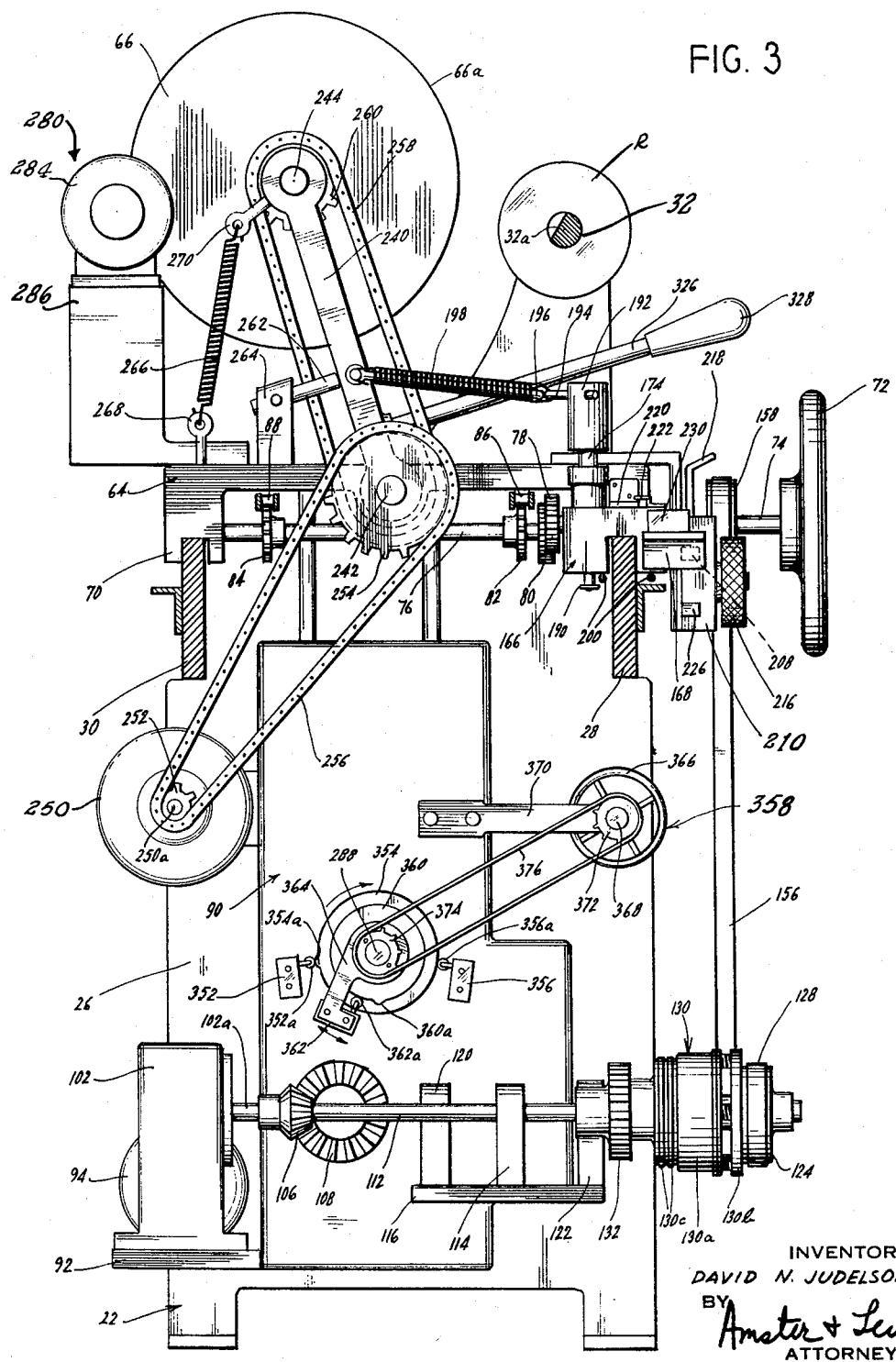
FIGURE 3 is an elevational view, on an enlarged scale, taken substantially along the line 3—3 of FIGURE 1 looking in the direction of the arrows.

The knife shaft 244 is rotated at the required knife speed by a knife driving motor 250 (see FIGURES 2 and 3) which is mounted on the rear side of the housing 90 and is coupled to the knife shaft 244 by an appropriate chain and sprocket drive. Specifically, and as seen in FIGURE 3, the knife motor shaft 250a carries a driving sprocket 252 which is coupled to an intermediate sprocket 254 on the carrier pivot 242 by a connecting chain 256. The intermediate sprocket 254 is journaled on the knife carrier pivot 242 and is connected to a further intermediate sprocket (not shown) which serves as a driver for a chain 258 coupled to a driven sprocket 260 fixed to the knife shaft 244. It will be appreciated that the knife drive and its coupling do not interfere with the movement of the knife carrier 240 through its forward and return strokes for advancing and retracting the knife through its cutting cycle.

The rear or retracted position for the knife is established by a fixed stop 262 mounted by a bracket 264 on the knife carriage 64 (see FIGURE 3). The fixed stop 262 bears against the rear surface of the carrier 240 and supports the same in a position rearwardly inclined relative to the vertical wherein the knife carrier 240 rests against the fixed stop 262 by its own weight and the resultant gravity force. The knife carrier 240 is biased by a spring 266 into the retracted or outer limit position established by the fixed stop 262. The biasing spring 266 is connected at one end to the carriage 64 by an anchoring pin 268 and is connected at the other end to the carrier 240 by an anchoring pin and yoke 270 which is journaled on the knife shaft 244.

Mounted on the knife carriage 64 in operative relation to the knife 66 when in the retracted or outer limit position is a grinding unit 280 which includes a grinding stone 282 adapted to make contact with and sharpen the beveled cutting edge 66a of the knife 66. The grinding stone or wheel 282 is driven by a grinding motor 284 and is supported on and connected to the drive shaft 284a of the grinding motor 284. The motor 284 in turn is adjustably mounted on the knife carriage 64 by a grinder pedestal or bracket 286. As is generally understood, the action of the grinding unit against the rotary cutting knife 66 is such as to tend to rock the knife 66 out of its retracted position, that is, in a forward direction away from the fixed stop 262 against the biasing effect of the spring 266. Any tendency which the knife 66 has to displace out of a stationary position during the grinding manifests itself in the formation of a somewhat wavy cutting edge 66a on the knife 66. With the described arrangement, wherein the knife carrier bears against a fixed stop 262, with the retracted position established by the stop and the biasing spring 266, sufficient reaction force is provided to the tendency of the knife 66 to move away from the grindstone 282 such as to maintain the rotary knife 66 in the required stationary position for grinding thereby assuring the provision of a well-defined, sharpened cutting edge. As the cutting edge is ground down, the operator periodically adjusts the position of the grinding unit 280.

Figure 4:
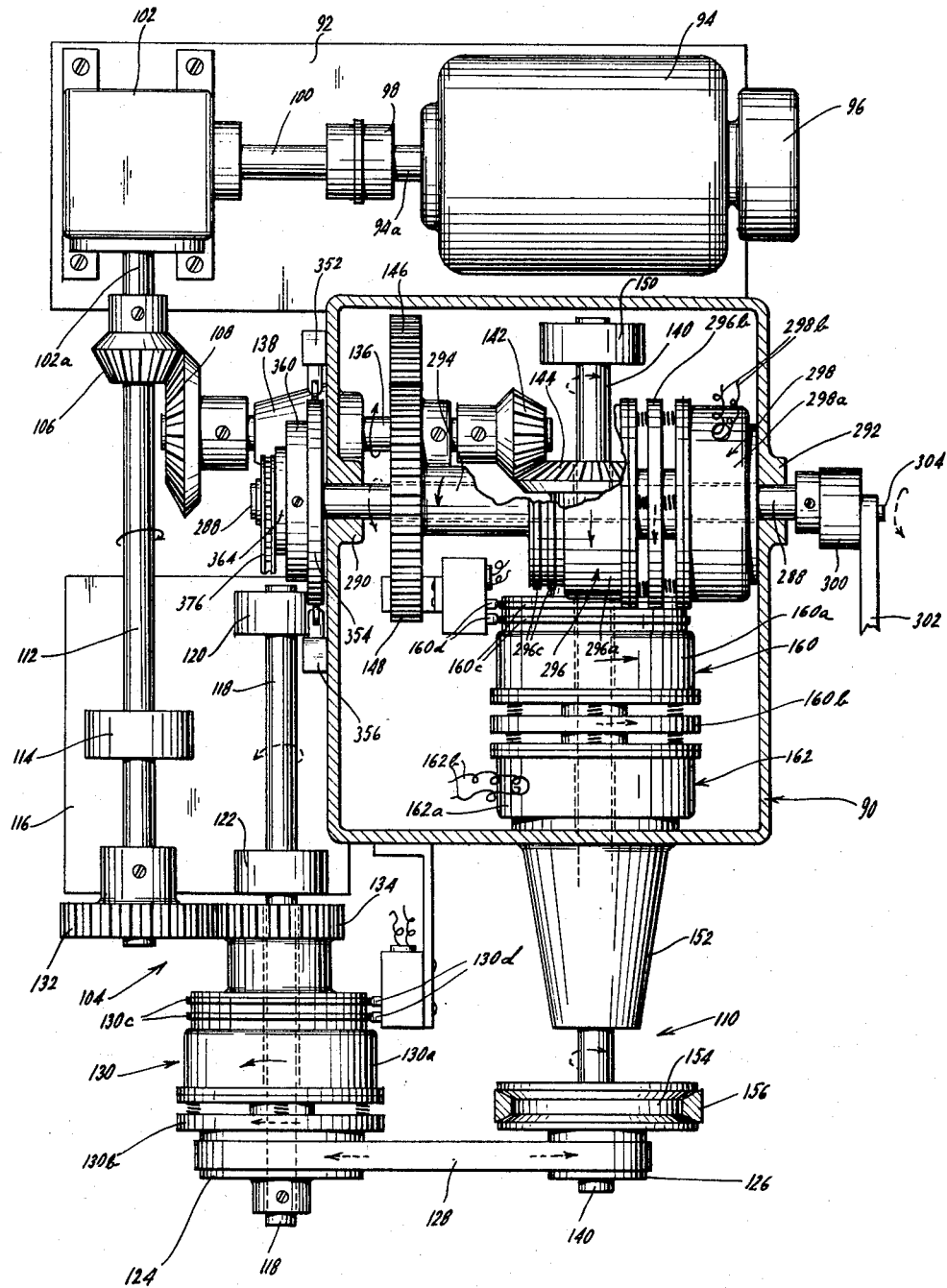
FIGURE 4 is a sectional view, on an enlarged scale, taken substantially along the line 4—4 of FIGURE 1 looking in the direction of the arrows and showing the details of the traversing drive for the carriage and the cycling drive for the knife carrier or assembly.
Figure 5:
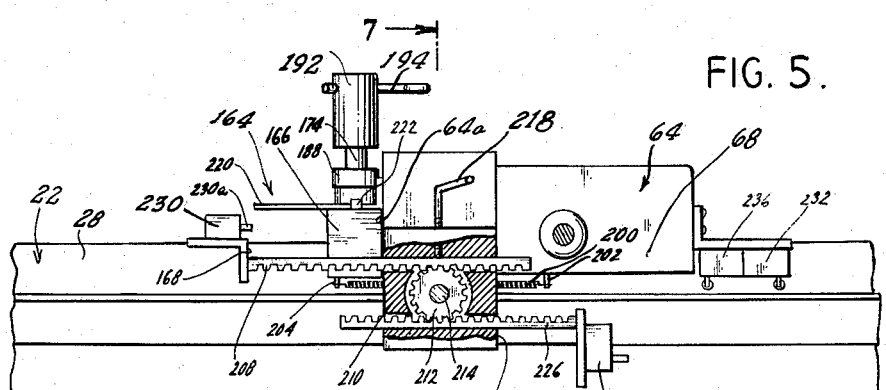
FIGURE 5 is a fragmentary front elevational view, on an enlarged scale and with parts broken away, showing the details of the adjustable sizing or indexing mechanism for establishing the width of successive cuts to be made by the machine.
Figure 7:
FIGURE 7 is a sectional view taken substantially along the line 7—7 of FIGURE 5 and looking in the direction of the arrows.

Reference will now be made to FIGURE 2, 4 and 12 to 14 inclusive for a description of the mechanisms for manual and automatic actuation of the carrier 240 through the prescribed forward stroke to the advanced or inner limit position wherein the cutting edge 66a of the knife 66 cuts through the roll of material R and the core C and for return to the retracted or outer limit position. As previously indicated, the forward actuating shaft 136 via the gearing 146, 148 provides a take-off for the automatic operation of the knife carrier from the electric motor 94. Specifically, and as seen in FIGURES 2 and 4, a carrier drive shaft 288 is arranged substantially parallel to the forward actuating shaft 136 and is journaled between opposite side walls of the housing 90 in appropriate bearings 290, 292. Journaled on the carrier drive shaft 288 within the housing 90 is the driving gear 148 which is operatively connected via a sleeve 294 to an electric clutch 296. The electric clutch 296 includes a driving clutch member 296a connected to the gear 148 via the sleeve 294, a driven clutch member 296b connected to the carrier drive shaft 288, commutator rings 296c and brushes 296d contacting the commutator rings 296c. As will be detailed hereinafter, the electric clutch 296 is selectively energized in accordance with the excitation current applied via the brushes 296d and the commutator rings 296c for the various control functions as will be detailed in connection with the description of the control system in FIGURE 15. Journaled on the carrier actuating shaft 288 is an electric brake 298 which includes a brake shoe 298a fixed to the housing 90 and selectively operable in accordance with the energizing potential applied to the terminals 298b for attracting the driven clutch member 296b for the purpose of braking the carrier drive shaft 288. The coordination of the brake 298 into the overall control system will also be described in connection with FIGURE 15.

One end of the carrier actuating shaft 288 projects beyond the side wall of the housing 90 and carries an eccentric member or crank 300 which actuates a crank arm or actuating member 302 connected thereto at the eccentric pin 304. The crank arm or actuating member 302 is reciprocated through a stroke which depends upon the spacing of the eccentric pin 304 relative to the carrier actuating shaft 288. This reciprocating movement is employed to move the knife carrier 240 through the required forward stroke, with the actuating member 302 forming part of an improved lost motion coupling (generally designated by the reference numeral 306), which will now be described in detail. As seen best in FIGURE 2, the crank arm or actuating member 302 is formed with an elongated guideway or slot 308 terminating at its upper end limit in an actuating or driving abutment 310 which is adapted to engage a follower member 312 confined within the guideway or slot 308. The follower member 312 is operatively connected to the carrier 240 as will be described, and when contacted by the actuating abutment 310 will pivot the carrier 240 about its pivot 242 through a prescribed forward thrust dependent upon the effective stroke of the actuating member 302 relative to the follower 312. In the position illustrated in FIGURE 2 and with the carrier actuating shaft 288 driven in the counterclockwise direction, the actuating member 302 is at the upper limit of its reciprocation and is in position to travel downwardly through the stroke established by the spacing between the eccentric pin 304 and the carrier actuating shaft 288. For the first portion of the downward stroke and until the actuating abutment 310 contacts the follower member 312, there is no effective coupling between the carrier actuating shaft 288 and the carrier 240; and in this respect the first portion of the downward stroke may be considered as a lost motion travel of the driving abutment 310 relative to the follower 312. After the abutment 310 contacts the follower 312, the remaining portion of the downward stroke provides an effective driving connection from the carrier actuating shaft 288 to the carrier 240 and rocks or rotates the carrier 240 in the counterclockwise direction about its pivot 242 to advance the rotary knife 66 out of its retracted position through a forward stroke which will depend upon the adjusted position of the follower 312 in the guideway 308. This adjusted position is established in accordance with the diameter of the rotary cutting knife 66 and the spacing of the knife axis 244 relative to the roll-supporting shaft 32 such that the peripheral cutting edge 66a of the knife 66 will reach an inner limit position contiguous to the flat 32a on the shaft 32 wherein the cutting edge 66a of the knife 66 will have cut through the roll R and its core C (see FIGURE 12).

The follower 312, which is in the form of a pin or roller, is mounted on a follower arm 314 formed at one end with a yoke or sleeve 316 journaled on the carrier pivot 242. The follower arm 314 has its other end pivotally connected by an adjustable length link 318 to an L-shaped extension 320 rigid with the carrier 240. The adjustable length link 318 includes an adjustment head 318a formed with a tapped hole which receives an adjustment screw 318b. The adjustment head 381a is pivotally connected by the pin 322 to the extension 320 and the screw 318b is pivotally connected by the pin 324 to the follower arm 314. It will be appreciated that the position of the follower member 312 within the guideway 308 can be adjusted by turning the adjustment screw 318b to either increase or decrease the spacing between the pivots 322, 324. As the follower 312 is brought closer to the actuating abutment 310 by increasing the spacing between the pivots 322, 324, there will be less lost motion travel of the actuating abutment 310 relative to the follower 312, with a longer effective driving stroke between the carrier actuating shaft 280 and the carrier 240 and with a corresponding increase in the forward travel of the knife 66 relative to the roll-supporting shaft 32. Accordingly, as the diameter of the knife 66 is decreased as the cutting edge 66a is sharpened and worn down by the grinding unit 280, it is possible to adjust the position of the follower 312 of the lost motion coupling 306 to continue to bring the cutting edge 66a of the reduced diameter knife 66 into the required inner limit or advance position contiguous to the flat 32a of the roll-supporting shaft 32.

The knife carrier 240 may be manually rocked about its pivot 242 in the counterclockwise direction to bring the knife into the advanced or inner limit position (see the dotted line showing of FIGURE 2) by a hand lever 326 terminating in an enlarged handle 328. As seen, the hand lever 326 is connected to the carrier 240 at a point spaced above the carrier pivot 242 such that the required counterclockwise movement of the carrier may be achieved by pressing down on the handle 328 of the lever 326. When such manual actuation is initiated, the follower 312 of the lost motion coupling 306 translates downwardly in the guideway 308. The length of the guideway 308 is selected such that the follower member 312 may move unobstructed in the guideway 308 incident to the manual movement of the knife carrier into its advanced or inner limit position through successively increasing forward strokes as the knife diameter is decreased with sharpening. Thus, the described automatic knife carrier drive is compatible with the means for manual actuation of the knife carrier; and it is not necessary to decouple the automatic knife carrier drive at such times when the operator may desire to manually move the knife carrier 240 through its forward stroke.

Figure 12:
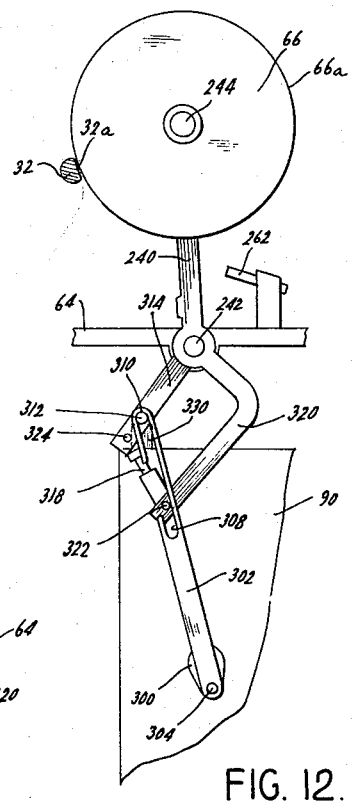
FIGURE 12 is a fragmentary elevational view similar to FIGURE 2, but showing the rotary cutting knife moved into the forward or inner limit position contiguous to the roll-supporting shaft, which inner limit position is illustrated by the dot-dash lines in FIGURE 2.

In order to establish the advanced or inner limit position for manual actuation of the knife carrier 240, a stop 330 is mounted on the upper wall of the housing 90 in position to contact an extension of the follower member 312, which extension projects from the follower arm 314 to the side thereof remote from the follower 312. The geometry of the stroke adjusting links 314, 318, having the three pivots 316, 322, and 324 is such that when the follower 312 is moved toward the actuating abutment 310 to increase the effective stroke of the actuating member 302, there is a corresponding increase in the spacing of the follower member 312 and its extension relative to the stop 330. Accordingly for manual operation, there is a corresponding increase in the forward stroke of the knife carrier 240 before the extension of the follower 312 contacts the stop 330. It will thus be appreciated that by a single adjustment the effective stroke may be increased for both automatic and manual operation. This may be more fully appreciated by referring to FIGURES 2 and 12 which illustrate respectively the knife and its associated mechanisms in the retracted or rear limit position and in the advanced or forward limit position. As seen in FIGURE 12, when the eccentric pin 304 is displaced 180° from the position illustrated in FIGURE 2 under control of the eccentric 300, the actuating member 302 is at the downward limit of its reciprocation, having travelled from the position illustrated in FIGURE 2 through the lost motion portion of the stroke established by the initial adjustment of the follower 312 relative to the actuating abutment 310 and through the operative portion of the downward stroke during which the carrier 240 is pivoted through the requisite arc about the pivot 242 to bring the peripheral cutting edge 66a to its forward or inner limit position contiguous to the flat 32a on the roll-supporting shaft 32. At this inner limit position, the extension of the follower 312 bears against the fixed stop 330, as is required for establishing the inner limit position if the operator manually rocks the knife carrier 240 through the same arcuate travel. It will be appreciated that during the 180° of counterclockwise rotation of the carrier drive shaft 280, the knife carrier 240 will return to the retracted position under the influence of its biasing spring 266 as established by the fixed stop 262. The rate of return is determined by the rate of displacement of the actuating member 302 through its upward or return stroke to the position illustrated in FIGURE 2, it of course being appreciated that carrier return is achieved by the spring 266 and the retracted position is established by the spring 266 and the coacting stop 262. Although not illustrated, the grinding unit is mounted for adjustment toward the knife shaft 244 such that the knife may be sharpened as it wears down. In each such adjusted position of the grinding unit 280, the necessary reaction force is provided by the spring 266 and the stop 262 to assure excellent grinding and the provision of a well-defined sharpened cutting edge 66a.

Figures 13, 14:
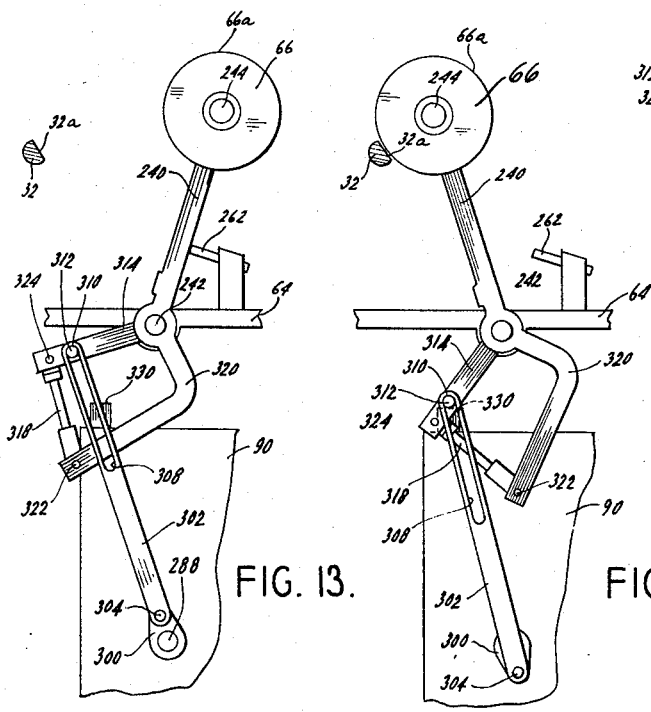
FIGURE 13 is a fragmentary elevational view similar to the showing of FIGURE 2, illustrating the setting of the adjustable stroke linkage for the condition wherein the rotary cutting knife is reduced in diameter as a result of machine operation and the necessary grinding of said knife, the rotary knife being shown in its retracted or clearance position.
FIGURE 14 is a diagrammatic view similar to FIGURE 13 showing the rotary cutting knife in its forward or inner limit position adjacent the roll-supporting shaft.

In FIGURES 13 and 14 there is diagrammatically shown the relative position of the driver 310 and follower 312 of the lost motion coupling 306 for maximum forward travel of the knife carrier 240, corresponding to the condition which might occur when the rotary knife 66 is sharpened to the minimum diameter useful in the present machine. The position of FIGURE 13 illustrates the knife carrier 240 in the retracted position against the fixed stop 262, while the FIGURE 14 position illustrates the knife carrier 240 as rocked through the maximum forward stroke, with the beveled cutting edge 66a of the reduced diameter knife 66 contiguous to the flat 32a of the roll-supporting shaft 32. Referring to FIGURE 13, it will be seen that the follower 312 is adjusted in the slot 308 to be in contact with the actuating abutment 310 such that the entire downward stroke of the reciprocable actuating member 302 is employed for achieving forward movement of the carrier 240 toward the roll-supporting shaft 32. In this position of maximum adjustment, the follower 312 is also at the maximum spacing from the fixed stop 330 such that the carrier 240 may be manually moved through the maximum forward stroke by the operator, with the extension of the follower 312 contacting the fixed stop 330 when the peripheral cutting edge 66a of the reduced diameter knife 66 is contiguous to the roll-supporting shaft 32, as seen in FIGURE 14.

In order to lock the knife carrier 64 in successive index cutting positions, provision is made for mechanically and electrically braking the knife carriage 64 at the start of a cutting cycle. From the mechanical standpoint, a mechanical brake 332 is provided on the knife carriage 64 and is selectively engageable with the machine frame 22 as the knife carrier 240 begins its forward stroke. As seen best in FIGURE 2, the mechanical brake 332 includes a front brake shoe 334 movable into engagement with the front rail 28, a rear brake shoe 336 movable into engagement with the rear rail 30, a front brake actuating lever 338 pivoted on the carriage at the pivot 340 and arranged to engage the front brake shoe 334, and a rear brake actuating lever 342 pivoted at 344 on the carriage 64 and arranged to engage the rear brake shoe 336. The arm 342a of the lever 342 extends over the arm 338a of the lever 338 and is in urged contact therewith by an adjustable nut 346 which is threaded through a trapped hole in the arm 342a and bears against the arm 338a. The arm 342a carries a cam follower 348 which is engaged by a follower roller 350 fixed to the L-shaped extension 320 of the carrier 240. The development of the cam 348 is selected such that in response to counterclockwise movement of the carrier extension 322 about the carrier pivot 242 (when viewed in FIGURE 2), the lever arm 342a is turned in a counterclockwise direction about the pivot 344 to engage the rear brake shoe 336 and correspondingly the lever arm 338a via the nut 346 is urged in the clockwise direction about the pivot 340 to engage the front brake shoe 334.

From the electrical standpoint, a first carrier-operated switch 352 (see FIGURE 3) is arranged to be opened in response to movement of the knife carrier 240 out of the rearward or retracted position for control function, including the engagement of the traverse brake, as will be detailed in connection with the description of the control system of FIGURE 15. As seen in FIGURE 3, the carrier actuating shaft 288 carries a switch control cam 354 having a rise portion 354a in engagement with the actuator 352a of the switch 352 to maintain the switch closed while the knife carrier 240 is in the retracted position. In response to actuation of the carrier actuating shaft 288 incident to automatic cycling of the knife carrier 240, the rise portion 354a of the switch control cam 354 moves out of contact with the switch actuator 352a to open the switch 352 for the desired control functions, as will be described in connection with FIGURE 15. A further carrier-operated switch 356 having an actuator 356a is arranged to be contacted by the rise portion 254a of the switch control cam 354 when the switch control cam 354 is turned through 180° by the carrier actuating shaft 288, which corresponds to the maximum downward position of the actuating member 302 (see FIGURE 12) and the forward or inner limit position of the knife carrier 240. The switch 356 is connected in the control system, as will subsequently be described in connection with FIGURE 15.

In accordance with the invention, and as will be detailed in connection with the description of the control system of FIGURE 15, provision is made for adjusting the rate of travel of the knife carrier 240 during the cutting cycle by changing the speed of the variable speed drive motor 94. Since the time required for the periph- eral cutting edge 66a of the knife to approach the outer periphery of the roll R represents wasted time in the overall cutting cycle, the invention provides for the movement of the knife carrier 240 through a first portion of its forward stroke to bring the cutting edge 66a of the knife 66 into a roll-penetrating position contiguous to the outer periphery of the roll at a relatively high approach speed. In response to the movement of the cutting edge 66a of the rotary knife into a roll-penetrating position contiguous to the outer periphery of the roll R, provision is made for changing the rate of travel of the carrier 240 to achieve a somewhat lower rate of travel for penetration into the roll until such time as the cutting edge 66a of the knife 66 is in a penetrated position, whereupon a still different rate of travel may be established for the knife carrier 240 to move the peripheral cutting edge of the knife from the roll-penetrated position inwardly of the outer periphery of the roll R to the inner limit position contiguous to the roll-supporting shaft 32 and inwardly of the core C. The details of the means for establishing different rates of travel for the knife carrier 240 is described in connection with the control system of FIGURE 15. However, since the machine is required to handle rolls of different diameters, provision is made for adjusting the location at which the knife carrier 240 changes its rate of forward travel for a somewhat low-speed entry of the cutting edge 66a of the knife 66 into the outer periphery of the roll R. As seen best in FIGURES 1 and 3, an adjustable diameter control, generally designated by the reference numeral 358, is incorporated into the machine which is adjusted in accordance with the location of the roll-penetrating position of the peripheral cutting edge 66a of the knife 66 relative to different diameter rolls to be cut, such that for each diameter, the control 358 may be set such that the peripheral cutting edge of the knife is brought to the desired roll-penetrating position contiguous to the outer periphery of the roll R at the approach speed and thereafter adjusted in speed for appropriate penetration into the roll. The diameter control 358 includes a diameter control cam 360 fixed to the carrier actuating shaft 288 and having a rise portion 360a for operating a switch 362 which will initiate the control functions to change the rate of travel of the knife carrier 240 as described hereinafter in connection with FIGURE 15. The switch 362 has its actuator 362a disposed at a roll-penetrating position in the path of the rise portion 360a of the cam 360, which as seen in FIGURE 3, turns in the clockwise direction. In order to establish the location of the switch 362 for various roll-penetrating positions which change in accordance with the diameter of the roll, the switch 362 is carried on a rockable supporting arm 364 which is journaled on the carrier drive shaft 288. The supporting arm 364 is movable under control of the operator to space the switch actuator 362a relative to the rise portion 360a of the cam 360 in accordance with the diameter of the roll by means of a calibrated diameter control wheel 366 which is mounted on a control shaft 368 journaled on a supporting bracket 370 fixed to the front side of the housing 90 at a location accessible to the operator. The control shaft 368 carries a driving sprocket 372 which is coupled to a driven sprocket 374 fixed to the supporting arm 364, the sprockets 372, 374 being coupled together by a chain 376. The diameter control wheel or knob 366 is appropriately calibrated such that the operator can set the position of the switch actuator 362a relative to the rise portion 360a of the cam in accordance with diameter. For larger diameter rolls, the approach portion of the forward stroke will be smaller and accordingly the rise portion 360 should have a relatively short travel before actuating the switch 362 for the desired speed-changing function. For smaller diameter rolls, the switch actuator 362a is moved away from the rise portion of the cam to increase the portion of the forward stroke of the knife carrier at the approach speed.

Reference will now be made to the schematic diagram of FIGURE 15 which illustrates the improved coordinating control system which is incorporated in my improved rotary knife cutting machine and embodies further principles of the invention. Conveniently, the system may be mounted in a housing having a control panel, which is readily accessible to the operator. For example, it has been found convenient to mount the housing and its control panel of the knife assembly 62 and to connect the control system of the motor 94, the brake 96 and the several other control components by a multiple-lead cable. The control system in general includes an alternating current sequencing control 380, a direct current brake and clutch control 382, and a variable speed motor control 384.

The overall control system is energized from a single phase alternating current source via the main input leads 386, 388 which source is applied to the system over a double pole single throw control switch 390. The several control components of the sequencing control 380 are connected across the input leads 386, 388. Further, the input leads 386, 388 are utilized as the energization source to a full-wave rectifier 392 which provides direct current across the leads 394, 396 for the direct current brake and clutch control 382. Still further, the alternating current input leads 386, 388 are connected to the input terminals 400, 402 of the motor 94 and its associated eddy current clutch.

The commercially available adjustable speed drive 94, which is described in detail in the brochure previously mentioned, includes an alternating current drive motor and an eddy current clutch or coupling. The A.C. motor stator utilizes the motor shell as its supporting frame and the rotor of the motor is a constant speed member and is rotated at motor speed. Depending upon the energization applied to the eddy current clutch coil, there will be provided a variable speed output at the motor shaft 94a. The internal electronic control for the variable speed drive 94 which is also generally known, includes a thyraton tube, with the clutch coil connected in the plate circuit of the tube. The clutch coil may be disconnected from the thyraton plate to deenergize the clutch by the provision of an appropriate switch across the clutch terminals 404, 406, for a purpose which will subsequently be described. When there is a jumper or closed circuit across the terminals 404, 406 the output speed on the drive shaft 94a will depend upon the setting of the speed control potentiometer connected across the speed control terminals 408, 410, 412. Various speeds will be established for the drive shaft 94a by the selective connection across the speed control terminals 408, 410, 412 of various impedances, including a fixed resistance 414 which is of a value to achieve the required traverse speeds via the previously described reduction gearing arrangements, an entry speed control potentiometer 416, which is of a value to establish the speed at which the knife edge penetrates in the roll R, a cutting speed potentiometer 418 which is of a value to establish the speed at which the knife cuts through the roll, and a chuck and speed control potentiometer 420 which is of a value to establish a different speed for the knife in its cycle adjacent the chuck end of the roll. The settings for the several potentiometers and their selective connections across the speed control terminals of the variable speed drive 94 will be further appreciated as the description proceeds.

The alternating current sequence control 380 includes a main start-stop push button 422 which is connected via the closed contacts of a right traverse push button 424 and the open contacts of a left traverse push button 426 to the coil of a relay B. The push buttons 424, 426 have cross-over lockout connections, as is generally understood, with the coil of the relay A being energized over the normally open contacts of the push button 424 and over the normally closed contacts of the push button 426. Accordingly, upon depressing the push button 424, the relay A is energized over the normally closed contacts of the push button 426; and conversely upon depressing the push button 426, the relay B is energized over the normally closed contacts of the push button 424. If both push buttons are simultaneously depressed neither relay A, B is energized. The relay A includes a contact pair A$b$ in the brake and clutch control 382 which connects the right traverse clutch 160 across the D.C. lines 394, 396 when an energization circuit is completed via the contact pairs L$b$, E$b$. Accordingly, upon energization of the relay A by depressing the right traverse push button 424, the right traverse clutch 160 is brought into operation to move the knife carriage toward the chucked end of the roll. The relay B includes a contact pair B$d$ in the control 382 which when operated from its normal position in response to energization of the relay B, connects the left traverse clutch 130 across the direct current lines 394, 396. Accordingly, upon depressing the left traverse push button 426 the left traverse clutch 130 is energized with a corresponding cut out of the possible energization circuit for the right traverse clutch 162. In order to establish holding circuits for the respective push buttons 424, 426 such that the push buttons may be released after initiating the right or left traversing movement, the relay A includes another contact pair A$a$ which provides its holding circuit over the push button 422, the normally closed right limit switch 232 and the lockout control of push button 426. Similarly, a holding circuit is provided for the relay B by the contact pair B$a$ which is connected to the push button 422 via the left limit switch 234 and over the lockout control of the push button 424. Due to the connection of the right and left limit switches 232, 234 in the respective holding circuits for right and left traversing movement, it will be appreciated that the traversing drive will be interrupted at the respective limits established by the location of the switches and when the switches 232, 234 are opened by the movement of the carriage 64 into the corresponding limit positions.

A further relay D has its energizing coil connected across the A.C. lines 386, 388 via the normally closed main push button 422 and the normally open right limit switch 232. The relay D includes a contact pair D$a$ which when closed completes an energization circuit for the carriage-traverse brake 162 connected between the D.C. lines 394, 396 of the control 382 via the normally closed contact pair B$b$ of the relay B. Accordingly, when the carriage reaches the right limit of its travel and operates the right limit switch 232, not only is the energization circuit for the right traverse clutch 160 disrupted, but further the relay D closes the contact pair D$a$ to energize the traverse brake 162 so as to bring about instantaneous stopping of the knife assembly 62 in the right limit position established by the location of the right limit switch 232 and its fixed limit stop on the machine frame.

The slip control switch 230 which is mounted on the movable stop 168 of the indexing or sizing mechanism 164 and is closed at a preset distance prior to the end of successive longitudinal traversing strokes is connected across the A.C. lines 386, 388 in series with the energizing coil of the relay E. The relay E includes a contact pair E$b$ in the control 382 over which the energization circuit for the right traverse clutch 160 is established. Switching of the contact pair E$b$ upon energization of the relay E connects an adjustable glide control resistance 428 in circuit with the right traverse speed control potentiometer 430 which provides a vernier adjustment for the right potentiometer 430 and the adjustable impedance 432 which provides for a course setting for the right traverse speed. Accordingly, upon energization of the relay E, an additional resistance, depending upon the setting of the adjustable glide control resistance 428, will be connected into the energization circuit for the right traverse clutch 160 to decrease the effective clutch current and to bring about a corresponding decrease in effective clutch coupling such that the movable stop 168 will glide into contact with the relatively fixed stop 166 of the indexing mechanism 164. Thereafter, the right traverse clutch 160 will slip to effectively urge the stop 168 against the stop 166 to precisely maintain the indexed cutting position of the carriage 64 until the indexing mechanism is reset for the next cutting cycle.

The relay E includes a further contact pair E$a$ which is arranged to initiate the timing function of one of three standard timers M, N, O incorporated in the sequence control 380. Each of the timers is of identical construction and is available on the market. The timers are alternating current operated and set in operation by the respective contact pairs E$a$, J$b$ and N$a$, with the timers being connected across the A.C. lines 386, 388 in standby condition. The timing intervals will be established by the setting of the associated timing potentiometers $m$, $n$, $o$ and are each effective after a preset elapsed time from initiation of their respective timing functions to achieve certain control functions. Specifically, after the elapsed time interval of the timer M, during which time the knife 66 is in the retracted position against the grinding wheel 282 of the grinding unit 280, the contact pair M$a$ which controls the energization of the relay C is closed. The contact pair M$a$ is connected in a series circuit with the contact pair A$a$, which is closed in response to energization of the relay A and depression of the right traverse push button 424, the closed right limit switch 232, and the main push button 422. The relay C includes a contact pair C$a$ in the control 382 which normally completes a D.C. energization circuit for the knife carrier brake 298 between the D.C. lines 394, 396. On energization of the relay C, the contact pair C$a$ switches over to deenergize the brake 298 and to complete the energization circuit for the knife carrier clutch 296, whereby drive to the knife carrier 240 is initiated. The knife carrier 240 starts to move forward through its cutting cycle at the rate of travel established by the setting of the control potentiometer 434 of the knife carrier clutch 296 and the setting of the impedances in the control 384 for the variable speed motor 94 which is the driving source for cycling of the knife carrier. As seen, the variable speed control 384 is set by its various relay contact pairs K$a$, K$b$, O$a$ and O$b$, and G$a$ and G$b$ such that the resistance 414 is connected across the speed control terminals 408, 410, 412. The potentiometer 434 is set in relation to the traverse speed established by the resistance 414 to bring the knife carrier 240 forward at the rate of travel desired for a relatively high speed approach to the roll-penetrating position relative to the outer periphery of the roll R.

As the knife carrier 240 starts its forward travel at the approach speed after the grinding time interval has elapsed as by the closing of the switch M$a$ under control of the timer M, the rear-position switch 352, which is held closed by the knife carrier 240 in its rearward or retracted position, is opened. As seen, the switch 352 is connected in the sequence control 380 to energize the relay L for so long as the knife carrier 240 is in the rearward or retracted position against its fixed stop. When the switch 352 is opened as the knife carrier 240 starts forward through the cutting cycle, the contact pair L$a$ which shunts the slip or glide control switch 230 is closed to provide a shunting energization circuit for the control elements sequenced by the switch 230 such that when the indexing mechanism 164 is automatically restored to its starting position with the fixed stop spaced from the movable stop, incident to movement of the carrier 240 through the cutting cycle. This also opens the switch 230 and the sequence control will still be conditioned for the operation.

The normally energized relay L includes a further contact pair L$b$ incorporated in the brake and clutch control 382. The contact pair L$b$ in the deenergized position of the relay L completes a circuit for the carriage traverse brake 162 via the contact pair A$b$ between the D.C. lines 394, 396.

Accordingly, as the knife carrier 240 starts its cutting cycle, with the relay A energized, the traverse brake 162 is applied to the knife carrier 64 for electrically locking the carriage in its indexed cutting position. This also disables the right traverse clutch 160.

The diameter control switch 362 is connected over the contact pair L$a$, the front position carrier switch 356, the chuck-end limit control switch 224 and the closed contact pair K$a$ of the relay K to the relay H. Accordingly, as the knife carrier 240 travels forward into the roll-penetrating position, established by the location of the diameter control switch 362 relative to the rise portion 360$a$ of the diameter control cam 360, an energization circuit is provided for the relay H between the alternating current lines 386, 388 via the closed contact pair L$a$, the switch 356, the switch 224, the switch 362 and the closed contact pair K$a$. The relay H includes a closed contact pair H$a$ in the energization circuit for the relay C in the sequence control 380. Further, the relay C also includes an open contact pair H$b$ connected in series with the electric brake 96 for the variable speed motor 94. Still further, the relay H includes a closed contact pair H$c$ connected across the terminals 404, 406 of the motor 94 over which closed contact pair H$c$ the clutch coil is energized. Accordingly, in response to energization of the relay H, the contact pair H$a$ opens to deenergize the relay C which restores the contact pair C$a$ to the position decoupling the knife carrier clutch 296 from the D.C. lines 394, 396 and coupling the knife carrier brake 298 across the D.C. line which brakes the carrier drive shaft 288. Further, closing of the contact pair H$b$ applies the motor brake 96 to the variable speed motor 94 and opening of the contact pair H$c$ deenergizes the eddy current clutch incorporated in the variable speed motor 94. It will thus be appreciated that the energization of the relay H is effective to almost instantaneously bring the knife carrier 240 to a stop or dwell position, with the decoupling of the clutch and application of the brake at the carrier actuating shaft 288. By this arrangement, decoupling of the drive and braking is achieved before and after the speed reduction gearing 102, 106, 108 such that the knife carrier 240 is almost instantaneously stopped, although prior to the closing of the diameter control switch 362 the knife carrier 240 was travelling forward at a relatively high approach speed.

The diameter control switch 362 also completes an energization circuit for the relay J which energization circuit includes the closed contact pair L$a$, the front position carrier switch 356, the chuck-end switch 224 and the diameter control switch 362 which connects the relay J across the lines 386, 388. The relay J includes a first contact pair J$a$ shunting the diameter control switch 362 which provides a holding circuit for the relay J when the diameter control switch 362 is subsequently restored to its normally open position as a result of the further movement of the diameter control cam 360 on the drive motor shaft 288. The relay J includes a further contact pair J$b$ which initiates the carrier stop timer N which is set to establish a prescribed stop time for the knife carrier by the adjustment of its potentiometer $n$.

The carrier stop timer N, after establishing the stop time interval in turn operates a contact pair N$a$ which in turn initiates the operation of the knife entry timer O. The knife entry timer O is set by its potentiometer $o$ to establish a predetermined time interval for movement of the knife carrier 240 from the roll-penetrating position with the knife at the outer periphery of the roll R to the roll-penetrated position with the knife inwardly of the outer periphery of the roll R. The carrier stop timer N includes a further open contact pair N$b$ which is connected in series with the energization coil of the relay K.

After expiration of the stop time interval, the contact pair N*b* is closed to energize the relay K which in turn has contact pairs K*a* and K*b* in the variable speed control 384 for the motor 94. In the deenergized position of the relay K, the resistance 414 which establishes the traversing speed is connected to the speed control terminals 408, 410, 412 over the contact pairs K*a*, K*b*, O*a* and O*b*, and G*a*, G*b*. Upon energization of the relay K at the end of the stop time interval, the contact pairs K*a*, K*b* switch over to connect the entry speed control potentiometer 416 across the speed control terminals and to disconnect the traverse speed control resistance 414 from said terminals. Accordingly, after the stop time interval the knife carrier 240 will be conditioned to travel forward at the knife entry speed established by the setting of the potentiometer 416.

The relay K has a third contact pair K*c* which is connected in the energization circuit for the relay H, specifically between the diameter control switch 362 and the relay coil. Accordingly, upon energization of the relay K, the energization circuit for the relay H is disrupted which restores the contact pair H*a* to its normally closed position energizing the relay C and completing the D.C. energization circuit for the clutch 296 over the contact pair C*a*. Further, the contact pair H*b* in the control 382 opens to deenergize the main brake 96 and the contact pair H*c* is restored to the closed position to again energize the eddy current clutch for the motor 94 in the control 384.

Accordingly, the knife carrier 240 travels forward at the knife entry speed as established by the setting of potentiometer 416 until the timing function is completed by the knife entry timer O at which time the contact pairs O*a*, O*b* of the timer O which are connected in the variable speed control 384 are switched over to connect the cutting speed control potentiometer 418 across the speed control terminals 408, 410, 412 thereby cutting out the traverse speed control resistance 414 and the entry speed control potentiometer 416.

The knife carrier 240 travels forward until such time as the front-position carrier switch 356 is operated as the knife carrier 240 reaches its inner limit position, with the cutting edge 66*a* of, the knife 66 contiguous to the roll-supporting shaft 32. When the switch 356 is actuated an energization circuit for the relay F is completed over the closed contact pair L*a*, and the switch 356 for a purpose to be described subsequently. Further, in response to the switch 356 being moved over to its other contact pair, the energization circuit to the relays H, J are opened and specifically the holding contact pair J*a* opens to condition the speed control sequencing arrangement for the next cutting cycle. At this time, the contact pairs K*a*, K*b*, O*a*, O*b* restore to the illustrated position and the variable speed control 384 is reestablished at the speed selected by the setting of the speed control resistance 414. Accordingly, the knife carrier 240 retracts substantially at the approach speed of the knife carrier 240 to the roll-penetrating position as established by the location of the adjustable diameter control switch 362.

When the knife carrier 240 restores to its rearward or retracted position, the rear-position carrier switch 352 is closed which completes the energization circuit for the relay L. This returns the contact pair L*b* to the position illustrated wherein the right traverse clutch 160 is energizeed for the next automatic traversing interval of the knife carriage. Further, when the relay L is restored to its energized position, the contact pair L*a* opens, and removes the holding circuit across the glide or slip control switch 230 of the indexing mechanism 164. The next cutting cycle is initiated by the next closing of the glide control switch 230 of the indexing mechanism 164 whereupon the cutting cycle is repeated as previously described.

When the chucked end of the roll R is approached, it is desirable to establish a chuck end speed for the cutting cycle which is different from the entry and cutting speeds during the previous cutting cycles. The chuck end speed is selected to assure proper penetration of the knife 66 into the roll R and to preclude any tendency which the knife 66 may have, if travelling forward at a high speed, to compress the outer periphery of the roll R and to release the same from the pins of the chuck 34 thereby disengaging the roll R from the chuck 34. The location of carriage traverse at which the cutting cycle is to switch over from the previously established cutting cycle, with the different entry and cutting speeds as determined by the setting of the potentiometers 416, 418, is determined by the location of the chuck and switch 224 and may be varied with different types of material. When the chuck end switch 224 is actuated, the relay G is conditioned for energization after the cutting cycle is initiated and the relay L is deenergized incident to opening of the rear-position carrier switch 352. The energization circuit for the relay G will include the closed contact pair L*a*, the switch 356, the switch 224, and the normally closed contact pair F*b* of relay F. Energization of the relay G operates the contact pairs G*a*, G*b*, in the motor control 384 to connect the chuck end speed control potentiometer 420 across the control terminals 408, 410, 412 such that the variable speed motor 94 drives at a rate dependent upon the setting of the chuck end speed control potentiometer 420. At the end of the forward stroke of the knife carrier 240, and when the cutting edge 66*a* of the knife 66 reaches its inner limit position contiguous to the roll-supporting shaft 32, the front position carrier switch 356 is operated such that its other contact pair completes the circuit for the relay F. The relay F includes an open contact pair F*a* which shunts the switch 356 and a closed contact pair F*b* in the energization circuit for the relay G. Accordingly, upon energization of the relay F, the energizing circuit for the relay G is opened despite the fact that the chuck end switch 224 is closed which restores the contacts G*a*, G*b* to the illustrated position in the motor control 384 such that the knife carrier 240 retracts at the approach speed as established by resistance 414. Closing of the open contact pair F*a* completes a holding circuit for the relay F over the closed contact pair L*a* as the knife carrier 240 starts through its rearward stroke and the front-position carrier switch 356 is restored to its illustrated position. The holding circuit for the relay F is maintained until such time as the rear-position carrier switch 352 is closed upon restoration of the knife carrier 240 to its retracted position, whereupon the contact pair L*a* opens, again preparing the sequencing control for the next cutting cycle conditioned for chuck end operation for so long as the chuck-end switch 224 is in its switched position cutting out the diameter control switch 362 and the timers M, N, O controlled in sequence thereby as previously described.

When the carriage approached the right limit position as established by the location of the right limit switch 232, the switch 232 is operated to complete the energization circuit for the relay D. Energization of the relay D closes the contact pair D*a* in the brake and clutch control 382 to complete the energization circuit for the traverse brake 162 over the contact pair B*b* to stop the carriage traverse.

At this time the operator releases the indexing mechanism 164 and depresses the left traverse button 426 which completes the energization circuit for the relay B and in turn closes the holding contact pair B*a* in circuit with the left limit switch 234, thereby providing a holding circuit for the relay B so long as the left limit switch 234 is closed. Also, the relay switches over the contact pair B*b* to deenergize the traverse brake 162 and to energize the left traverse clutch 130 so that the knife carriage will traverse to the left or return at the speed established by the setting of the left traverse control potentiometer 436. The knife carriage will traverse to the left until the stop and start push button 422 is operated or until the left traverse limit switch 234 is opened to disrupt the holding circuit for the relay B whereupon the knife carriage stops.

I have found that the actual overall elapsed time for a cutting cycle is limited by the speed at which the rotary knife 66 can be penetrated into the rotating roll of material R and also by the speed at which the material can be cut through from the position at which the cutting edge 66a of the knife 66 has penetrated to the inner limit position at which the cutting edge 66a of the knife 66 has cut through the core. The speed of penetration, which must be established in accordance with the type of material employed, the tightness of the roll and other variables, will determine the precision and quality of the cut made by the knife into the roll. If this roll-penetrating speed is too high, the knife will tend to distort the outer periphery of the roll, and possibly shred the roll wrapper and/or the outer plies of material. By properly adjusting the roll-penetrating speed, it is possible to bring the knife 66 into the body of the roll under conditions appropriate to assure a clean cut and sharp entry of the knife without distortion of the roll and/or the wrapper. After such proper roll penetration, the roll need not be cut at the roll-penetrating speed. Rather I have found that the knife carrier can be moved forward at an increased cutting speed or at a progressively increasing cutting speed. This is due in part to the fact that the peripheral speed of successive portions of the roll R, exposed to the knife 66, decreases as the knife 66 approaches the core C, that is the peripheral speed of the plies contiguous to the core is smaller than the peripheral speed of the plies at the outer periphery of the roll. By the described control arrangement, it is possible to minimize the wasted time in the cutting cycle, which wasted time is primarily represented by the time required for the cutting edge of the knife to approach the roll and the time required to retract the knife from the roll after the cutting stroke. It is also possible to penetrate at the optimum roll-penetrating rate and to cut at the optimum cutting rate as determined by the type of goods, the diameter of the roll, the tightness of the roll and other variables which are encountered in actual practice.

I have found that a relatively low speed should be established for roll penetration, which speed does not change appreciably from material to material and is much slower than a speed suitable for cutting.

In a typical, but purely illustrative, cutting cycle in accordance with the present invention, employing a 1" roll-supporting shaft, a roll of approximately 3½" in radius (3" from the outer periphery to the inside of the core) and a spacing between the cutting edge 66a of the rotary knife 66 and the axis of the roll-supporting shaft 32 of 7" (with clearance over something in excess of ⅛" provided by the flat 32a), the elapsed times for the various portions of such typical cutting cycle of approximately 3¾ seconds duration, can be established as follows:

| Interval of Cutting Cycle | Distance of Travel by Knife Carrier (inches) | Time of Travel (seconds) | Rate of Travel (inches per second) |
|---|---|---|---|
| Approach | 3½ | ½ | 7 |
| Stop | | ¼ | |
| Penetrate | ¼ | 1 | ½ |
| Cut | 2⅝ | 1 | 2⅝ |
| Retract | 6⅜ | Less than 1 | Approx. 7 |

If the optimum speed for roll penetration of approximately ½ inches per second were selected as the criterion for establishing the rate of travel of the knife carrier during the cutting cycle, then the time required for the knife to move from the roll-penetrating position through the total cutting stroke of 3⅛ inches would be approximately 6¼ seconds, which is seen to be appreciably longer than the 2 seconds required for penetration and cutting in accordance with the above illustration. If the proper penetration rate was the limiting factor for the cutting cycle, then the cutting cycle would take approximately 26½ seconds at the rate of ½ inch per second as compared by the illustrative example wherein the total cutting cycle requires 3¾ seconds. Accordingly, by my unique control the times in the cutting cycle are weighted to attain the optimum conditions for roll penetration and roll cutting.

From the above, it will be appreciated that substantial savings in time are realized by employing any one of the several concepts described herein and it is expressly intended that controls may be designed in accordance with the invention which do not embody all the desirable illustrative features. For example, an appreciable decrease in the time of the cutting cycle can be realized by employing only a relatively high speed approach or by employing only a relatively high speed withdrawal. Further, it may be possible to penetrate at a relatively higher speed, suited for cutting, with a corresponding sacrifice in the quality of the cut at the outer periphery of the roll.

It should be appreciated that the smallest saving in time in the cutting cycle will represent an appreciable saving in the overall machine cycle since the average machine is designed to handle rolls varying in width from approximately 24" to 60", with cuts varying in width from a fraction of an inch to several inches.

A latitude of modification, substitution and change is intended in the foregoing disclosure. In some instances, some features of the invention will be employed without a corresponding use of other features. Accordingly, it is appropriate that the appended claims be construed broadly and in a manner consistent with the spirit and scope of the invention herein.

What I claim is:

1. A traversing device for a cutting machine of the type including a frame, roll-supporting means on said frame having a roll-engaging face adapted to abut an end face of said roll, a knife assembly, and means mounting said assembly for longitudinal traverse on said frame toward an end limit position spaced from said roll-engaging face of said chuck, said traversing device comprising, a traverse drive operatively connected to said assembly, an indexing mechanism selectively operable to interrupt the longitudinal traverse of said assembly after a traverse increment corresponding to the width of the cut to be made in said roll of material, a limit stop on said frame, and limit control means on said assembly operable upon contact with said limit stop for interrupting operation of said traverse drive, said limit stop and said limit control means being adjusted such that said end limit position is spaced from said roll-engaging face by a distance corresponding to said traverse increment.

2. A traversing device for a cutting machine of the type including a frame, a roll-supporting means on said frame having a roll-engaging face adapted to abut an end face of said roll, a knife assembly, and means mounting said assembly for longitudinal traverse on said frame toward an end limit position spaced from said roll-engaging face, said traversing device comprising a traverse drive operatively connected to said assembly, an indexing mechanism selectively operable to interrupt the longitudinal traverse of said assembly after a traverse increment corresponding to the width of the cut to be made in said roll of material, means for adjusting said indexing mechanism such that said traverse increment may be changed to establish different cut widths, a limit control mechanism for interrupting operation of said traverse drive as said assembly approaches said end limit position, and means for adjusting said limit control mechanism in response to adjustment of said indexing mechanism such that said end limit position may be adjusted in dependence upon said traverse increment.

3. A traversing device for a rotary knife cutting machine of the type including a frame, a shaft adapted to receive a roll of material, a driven chuck having a roll-engaging face adapted to abut an end face of said roll and to engage said roll for rotating the same, a rotary knife assembly, and means mounting said assembly for longitudinal traverse on said frame toward an end limit position relative to said roll-engaging face of said chuck, said traversing device comprising a traverse drive operatively connected to said assembly, an indexing mechanism selectively operable to interrupt the longitudinal traverse of said assembly after a traverse increment corresponding to the width of the cut to be made in said roll of material, means for adjusting said indexing mechanism such that said traverse increment may be changed to establish different cut widths, a limit stop on said frame, limit control means on said assembly operable upon contact with said limit stop for interrupting operation of said traverse drive, and means for adjusting said limit control means in response to adjustment of said indexing mechanism such that said end limit position may be adjusted in dependence upon said traverse increment.

4. A traversing device for use in a cutting machine of the type including a frame, roll-supporting means on said frame having a roll-engaging face adapted to abut an end face of said roll, a knife assembly, and means mounting said assembly for longitudinal traverse on said frame toward an end limit position spaced from said roll-engaging face, said traversing device comprising a traverse drive operatively connected to said assembly, an indexing mechanism selectively operable to interrupt the longitudinal traverse of said assembly after a traverse increment corresponding to the width of the cut to be made in said roll of material, a limit stop on said frame, and limit control means on said assembly operable upon contact with said limit stop for interrupting operation of said traverse drive.

5. An adjustable actuating arrangement for use in a cutting machine including a shaft, a knife carrier, a rotary knife, and means mounting said knife on said knife carrier for movement through a prescribed stroke toward said shaft, said actuating arrangement comprising a drive for automatic operation, means coupling said drive to said knife for moving said knife through said stroke to bring the cutting edge of said knife to a limit position contiguous to said shaft, the coupling means including a lost motion connection having a driver and a follower serving as an actuating member for said carrier, manual actuating means for said knife, said follower being operatively connected to said manual actuating means and being movable away from said driver upon manual movement of said knife through said stroke, and a stop arranged to coact with said follower of said lost motion connection and contacted by said follower upon manual movement of said knife through said stroke.

6. An adjustable actuating device for use in a cutting machine including a shaft, a knife carrier, a rotary knife, and means mounting said knife on said knife carrier for movement through a prescribed stroke toward said shaft, said device comprising a drive for automatic operation, means coupling said drive to said knife for moving said knife through said stroke to bring the cutting edge of said knife to a limit position contiguous to said shaft, the coupling means including a lost motion connection having a driver and a follower serving as an actuating member for said carrier, said follower being adjustable toward said driver as said cutting edge of said knife wears to increase said stroke such that said cutting edge moves to said limit position, manual actuating means for said knife, said follower being operatively connected to said manual actuating means and being movable away from said driver upon manual movement of said knife through said stroke, a stop arranged to coact with said follower of said lost motion connection and contacted by said follower upon manual movement of said knife through said stroke, and means for adjusting said follower relative to said driver such that said follower may be moved toward said driver and simultaneously moved away from said stop whereby by a single adjustment said limit position is established for both automatic and manual operation.

7. A manual and automatic actuating mechanism for the knife assembly of a cutting machine which includes a carrier, a knife on said carrier, and means mounting said carrier for movement through a cutting cycle to advance said knife through a forward stroke toward a shaft supporting a roll of material and through a return stroke to a retracted position, said actuating mechanism comprising drive means, a lost motion coupling connecting said drive means to said carrier for automatic actuation of said carrier, said lost motion coupling including a follower member operatively connected to said carrier and an actuating member operatively connected to said drive means and movable through an actuating and return stroke under control of said drive means, said actuating member having a guideway engaging said follower and being effective to impart motion to said follower member upon travel of said actuating member through the portion of said actuating stroke required to bring an end limit of said guideway into engagement with said follower member, the remaining portion of said actuating stroke being effective to impart a prescribed forward stroke to said carrier, and manual actuating means operatively connected to said carrier for moving said carrier through said forward stroke, said follower member moving in said guideway away from said end limit through a lost motion travel in response to manual actuation of said carrier such that said manual actuation may be carried out with said lost motion coupling still operatively connected between said drive means and said carrier.

8. A manual and automatic actuating mechanism for the knife assembly of a cutting machine which includes a carrier, a knife on said carrier, means mounting said carrier for movement through a cutting cycle to advance said knife through a forward stroke toward a shaft supporting a roll of material and through a return stroke to a retracted position, said actuating mechanism comprising drive means, a lost motion coupling connecting said drive means to said carrier for automatic actuation of said carrier, said lost motion coupling including a follower member operatively connected to said drive means and movable through an actuating and return stroke under control of said drive means, said actuating member having a guideway engaging said follower and being effective to impart motion to said follower member upon travel of said actuating member through the portion of said actuating stroke required to bring an end limit of said guideway into engagement with said follower member, the remaining portion of said actuating stroke being effective to impart a prescribed forward stroke to said carrier, manual actuating means operatively connected to said carrier for moving said carrier through said forward stroke, said follower member moving in said guideway away from said end limit through a lost motion travel in response to manual actuation of said carrier such that said manual actuation may be carried out with said lost motion coupling still operatively connected between said drive means and said carrier, a stop arranged to coact with said follower member and contacted by said follower member upon movement of said knife through said prescribed forward stroke, and means for adjusting said follower member within said guideway relative to said end limit and to said stop such that said follower member may be moved closer to said end limit and correspondingly be moved away from said stop whereby by a single adjustment said stroke is increased for both automatic and manual actuation.

9. A cutting machine adapted for both manual and automatic operation, comprising a frame, a stationary shaft on said frame adapted to receive and support a roll of material, a driven chuck at one end of said shaft engageable with said roll for turning said roll on its axis, a knife carriage, means mounting said knife carriage on said frame for longitudinal traversing movement toward a chuck end postion adjacent said one end of said shaft, a traverse drive operatively connected to said knife carriage for moving said knife carriage toward and away from said chuck end position, an indexing mechanism on said knife carriage and selectively engageable with said frame for periodically stopping said knife carriage after successive traverse increments corresponding to the width of the cuts to be made on said roll, a knife carrier on said knife carriage, a knife on said carrier, means mounting said knife carrier for movement through a cutting cycle to advance said knife through a forward stroke toward said shaft and through a return stroke to a retracted position, drive means operable in response to operation of said indexing mechanism, a lost motion coupling connecting said drive means to said carrier for automatic actuation of said carrier, said lost motion coupling including a follower member operatively connected to said carrier and an actuating member operatively connected to said drive means and movable through an actuating and return stroke under control of said drive means, said actuating member having a guideway engaging said follower and being effective to impart motion to said follower member upon travel of said actuating member through the portion of said actuating stroke required to bring an end limit of said guideway into engagement with said follower member, the remaining portion of said actuating stroke being effective to impart a prescribed forward stroke to said carrier, manual actuating means operatively connected to said carrier for moving said carrier through said forward stroke, said follower member moving in said guideway away from said end limit through a lost motion travel in response to manual actuation of said carrier such that said manual actuation may be carried out with said lost motion coupling still operatively connected between said drive means and said carrier, a stop arranged to coact with said follower member and contacted by said follower member upon movement of said knife through said prescribed forward stroke, means for adjusting said follower member within said guideway relative to said end limit and to said stop such that said follower member may be moved closer to said end limit and correspondingly be moved away from said stop whereby by a single adjustment said stroke is increased for both automatic and manual actuation, and means responsive to movement of said carrier through said cutting cycle for resetting said indexing mechanism and for initiating traverse drive of said knife carriage.

10. A knife actuating mechanism for use in a cutting machine including a frame, roll-suporting means on said frame, a knife carrier, a rotary knife having a peripheral cutting edge mounted on said carrier for rotation about a knife axis, and means mounting said knife carrier for movement through a cutting cycle including a forward stroke and a return stroke, said actuating mechanism comprising means establishing a fixed retracted position for said carrier including a fixed stop and a spring biasing said carrier against said stop such that said knife axis is returned to the same retracted position after each cutting cycle, a drive mechanism operatively connected to said carrier for moving same through said forward stroke, and adjustment means for said drive mechanism for increasing the length of said forward stroke such that the peripheral cutting edge may be brought to an advanced position contiguous to said roll-supporting means as said knife wears with use.

11. A knife actuating and grinding mechanism for use in a cutting machine of the type including a frame, roll-supporting means on said frame, a knife carrier, a rotary knife having a peripheral cutting edge mounted on said knife carrier for rotation about a knife axis, and means mounting said knife carrier for movement through a cutting cycle including a forward stroke and a return stroke, said mechanism comprising means establishing a fixed retracted position for said carrier including a fixed stop and a spring biasing said carrier against said stop such that said knife axis is returned to the same retracted position after each cutting cycle, a drive mechanism operatively connected to said carrier for moving same through said forward stroke, adjustment means for said drive mechanism for increasing the length of said forward stroke such that the peripheral cutting edge may be brought to an advanced position contiguous to said roll-supporting means as said knife wears with use, and grinding means arranged to contact said knife in said fixed retracted position with said fixed stop and said spring serving to provide a reaction force to the force of said grinding means.

12. In a cutting machine including a shaft adapted to support a roll of material wound on a core, a support, a rotary cutting knife having a cutting edge, and a carrier mounting said knife on said support for movement through a cutting cycle from a retracted position spaced from said shaft through a forward stroke to an advanced position wherein said cutting edge is contiguous to said shaft, the improvement comprising a stop coacting with said carrier and establishing said retracted position for said knife, a spring operatively connected to said carrier and normally urging said knife into said retracted position, and an actuating mechanism operatively connnected to said carrier for moving said knife through said forward stroke, said actuating mechanism including a driving member and a driven member effective to impart movement to said carrier through said forward stroke and arranged to permit return of said carrier to said retracted position under the influence of said spring.

13. A knife mounting and actuating arrangement for use in a cutting machine including a frame, a shaft on said frame adapted to support a roll of material wound on a core, a movable knife carriage on said frame, and a rotary cutting knife having a cutting edge, said arrangement comprising a carrier mounting said knife on said carriage for movement through a cutting cycle from a retracted position spaced from said shaft through a forward stroke to an advanced position wherein said cutting edge is contiguous to said shaft, a stop coacting with said carrier and establishing said retracted position for said knife, a spring operatively connected to said carrier and normally urging said knife into said retracted position, and an actuating mechanism operatively connected to said carrier for moving said knife through said forward stroke, said actuating mechanism including a driving member and a driven member effective to impart movement to said carrier through said forward stroke and arranged to permit return of said carrier to said retracted position under the influence of said spring, a brake operative between said knife carriage and said frame for precluding movement of said knife carriage relative to said frame, and means responsive to movement of said carrier through said forward stroke for engaging said brake.

14. The combination with a rotary knife cutting machine including a frame, a knife assembly, means including a carriage mounting said knife assembly for longitudinal traverse on said frame, and an indexing mechanism selectively operable to interrupt the longitudinal traverse of said knife assembly after a traverse increment and including a relatively fixed stop and an adjustable stop, of a sizing mechanism for moving said adjustable stop relative to said relatively fixed stop for obtaining various traverse increments, said sizing mechanism including a rack operatively connected to said adjustable stop and mounted on said carriage, a pinion engaging said rack, and a manually operable control knob operatively connected to said pinion.

15. The combination with a rotary knife cutting machine including a frame, a knife assembly, means including a carriage mounting said knife assembly for longitudinal traverse on said frame, and an indexing mechanism selectively operable to interrupt the longitudinal traverse of said knife assembly after a traverse increment and including a relatively fixed stop and an adjustable stop, of a sizing mechanism for moving said adjustable stop relative to said relatively fixed stop for obtaining various traverse increments, said sizing mechanism including a rack operatively connected to said adjustable stop and mounted on said carriage, a pinion engaging said rack, a manually operable control knob operatively connected to said pinion, and means providing size calibrations indicative of the spacing between said relatively fixed and adjustable stops such as to provide an indication of the length of said traverse increments.

16. The combination with a rotary knife cutting machine, including a frame, a knife assembly, means including a carriage mounting said knife assembly for longitudinal traverse on said frame, an indexing mechanism selectively operable to interrupt the longitudinal traverse of said knife assembly after a traverse increment and including a relatively fixed stop and an adjustable stop, and locking means for releasably securing said relatively fixed stop to said frame in successive indexed positions, of a sizing mechanism for moving said adjustable stop relative to said relatively fixed stop for obtaining various traverse increments, said sizing mechanism including a rack operatively connected to said adjustable stop and mounted on said carriage, a pinion engaging said rack, a manually operable control knob operatively connected to said pinion, and means providing size calibrations indicative of the spacing between said relatively fixed and adjustable stops such as to provide an indication of said traverse increments.

References Cited by the Examiner

UNITED STATES PATENTS

| | | | |
|---|---|---|---|
| 1,127,525 | 2/15 | Runge. | |
| 1,242,448 | 10/17 | Judelshon | 82—86 |
| 2,186,583 | 1/40 | Groh | 82—49 |
| 2,457,310 | 12/48 | Judelshon | 82—86 |
| 2,776,590 | 1/57 | Korienek. | |

WILLIAM W. DYER, Jr., *Primary Examiner.*